(12) United States Patent
Hagood, IV et al.

(10) Patent No.: US 6,995,496 B1
(45) Date of Patent: Feb. 7, 2006

(54) ELECTRICAL POWER EXTRACTION FROM MECHANICAL DISTURBANCES

(75) Inventors: Nesbitt W. Hagood, IV, Wellesley, MA (US); Kaymar Ghandi, Arlington, MA (US); Jonathan R. Leehey, Wayland, MA (US); Aaron A. Bent, Wayland, MA (US)

(73) Assignee: Continuum Photonics, Inc., Billerica, MA (US)

( * ) Notice: Subject to any disclaimer, the term of this patent is extended or adjusted under 35 U.S.C. 154(b) by 0 days.

(21) Appl. No.: 09/584,881

(22) Filed: Jun. 1, 2000

Related U.S. Application Data

(63) Continuation-in-part of application No. 09/323,739, filed on Jun. 1, 1999, now Pat. No. 6,580,177.

(60) Provisional application No. 60/158,538, filed on Oct. 8, 1999.

(51) Int. Cl.
    *H01L 41/08*        (2006.01)
(52) U.S. Cl. ................. 310/317; 310/316.01; 310/318; 310/319; 310/339
(58) Field of Classification Search .......... 310/316.03, 310/319, 338, 339, 317, 316.01, 316.02, 310/318; 331/108 C, 116 R, 158
    See application file for complete search history.

(56) References Cited

U.S. PATENT DOCUMENTS

| | | | |
|---|---|---|---|
| 3,500,799 A * | 3/1970 | Benson | 123/478 |
| 3,626,310 A * | 12/1971 | Rhodes | 327/494 |
| 3,666,976 A | 5/1972 | Gourlay et al. | 310/8.8 |
| 3,819,963 A | 6/1974 | Kondo et al. | 310/8.7 |
| 4,091,302 A | 5/1978 | Yamashita | 310/339 |
| 4,387,318 A | 6/1983 | Kolm et al. | 310/330 |
| 4,442,372 A | 4/1984 | Roberts | 310/339 |
| 4,459,539 A | 7/1984 | Cordy, Jr. | 323/299 |
| 4,467,236 A | 8/1984 | Kolm et al. | 310/321 |
| 4,504,761 A | 3/1985 | Triplett | 310/800 |
| 4,536,700 A | 8/1985 | Bello et al. | 323/285 |
| 4,546,421 A | 10/1985 | Bello et al. | 363/21 |
| 4,595,856 A | 6/1986 | Glomb, Jr. | 310/339 |
| 4,629,970 A | 12/1986 | Johansson | 323/285 |
| 4,743,789 A * | 5/1988 | Puskas | 310/316.01 |
| 4,845,338 A | 7/1989 | Lakic | 219/211 |
| 4,849,668 A * | 7/1989 | Crawley et al. | 310/328 |
| 4,853,580 A | 8/1989 | Sula | 310/339 |
| 4,933,230 A | 6/1990 | Card et al. | 428/242 |
| 4,939,707 A | 7/1990 | Nagao | 368/64 |
| 5,033,496 A * | 7/1991 | Reid | 137/85 |
| 5,079,493 A * | 1/1992 | Futami et al. | 318/640 |

(Continued)

FOREIGN PATENT DOCUMENTS

CA    2257935    12/1997

(Continued)

OTHER PUBLICATIONS

International Search Report dated Oct. 19, 2000.

*Primary Examiner*—Thomas M. Dougherty
(74) *Attorney, Agent, or Firm*—Hamilton, Brook, Smith & Reynolds, P.C.

(57) ABSTRACT

A method of extracting power includes coupling a transducer that converts mechanical power to electrical power to a disturbance; coupling an electrical circuit to the transducer such that a peak voltage experienced by the transducer is greater than two times higher than any peak voltage of an open circuit transducer due to the disturbance alone; extracting power from the transducer using the electrical circuit, and storing extracted power. Power is extracted from the transducer and applied to the transducer during different intervals in the course of the disturbance. A system for extracting power includes a transducer, an electrical circuit, and a storage element for storing extracted power.

38 Claims, 18 Drawing Sheets

U.S. PATENT DOCUMENTS

| | | | | |
|---|---|---|---|---|
| 5,130,598 A | * | 7/1992 | Verheyen et al. | 310/316.03 |
| 5,208,506 A | | 5/1993 | Yamashita | 310/328 |
| 5,245,242 A | | 9/1993 | Hall | 310/316 |
| 5,305,507 A | | 4/1994 | Dvorsky et al. | 29/25.35 |
| 5,404,067 A | | 4/1995 | Stein et al. | 310/330 |
| 5,493,543 A | * | 2/1996 | Kamens | 368/255 |
| 5,512,795 A | | 4/1996 | Epstein et al. | 310/339 |
| 5,525,853 A | * | 6/1996 | Nye et al. | 310/316.01 |
| 5,548,177 A | | 8/1996 | Carroll | 310/339 |
| 5,552,656 A | * | 9/1996 | Taylor | 310/317 |
| 5,552,657 A | | 9/1996 | Epstein et al. | 310/339 |
| 5,578,889 A | | 11/1996 | Epstein | 310/339 |
| 5,621,264 A | | 4/1997 | Epstein et al. | 310/339 |
| 5,656,779 A | * | 8/1997 | Bronowicki | 73/668 |
| 5,656,882 A | | 8/1997 | Lazarus et al. | 310/328 |
| 5,687,462 A | | 11/1997 | Lazarus et al. | 29/25.35 |
| 5,703,474 A | | 12/1997 | Smalser | 323/299 |
| 5,751,091 A | | 5/1998 | Takahashi et al. | 310/339 |
| 5,775,715 A | | 7/1998 | Vandergrift | 280/602 |
| 5,779,149 A | * | 7/1998 | Hayes, Jr. | 239/124 |
| 5,783,898 A | | 7/1998 | Wu | 310/316 |
| 5,801,475 A | * | 9/1998 | Kimura | 310/319 |
| 5,814,921 A | | 9/1998 | Carroll | 310/339 |
| 5,835,996 A | | 11/1998 | Hashimoto et al. | 323/364 |
| 5,839,508 A | | 11/1998 | Tubel et al. | 166/65.1 |
| 5,857,694 A | | 1/1999 | Lazarus et al. | 280/602 |
| 5,900,690 A | * | 5/1999 | Gipson et al. | 310/316.01 |
| 5,907,212 A | * | 5/1999 | Okada | 310/328 |
| 6,072,267 A | * | 6/2000 | Atsuta | 310/323.06 |
| 6,147,433 A | * | 11/2000 | Reineke et al. | 310/316.03 |
| 6,191,519 B1 | * | 2/2001 | Nye et al. | 310/316.01 |
| 6,252,334 B1 | * | 6/2001 | Nye et al. | 310/328 |
| 6,252,336 B1 | * | 6/2001 | Hall | 310/319 |
| 6,486,589 B1 | * | 11/2002 | Dujari et al. | 310/331 |
| 2001/0035697 A1 | * | 11/2001 | Rueger et al. | 310/316.03 |

FOREIGN PATENT DOCUMENTS

| | | |
|---|---|---|
| EP | 0 673 102 A1 | 9/1995 |
| JP | 3-25161 * | 11/1991 |
| JP | 11-341837 * | 5/1998 |
| WO | WO9704841 | 2/1997 |
| WO | WO9834689 | 8/1998 |
| WO | WO 99/23749 | 10/1998 |

* cited by examiner

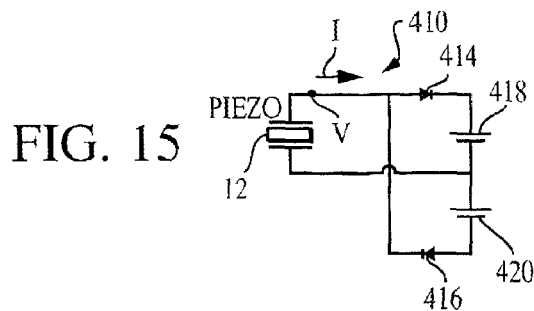
FIG. 15
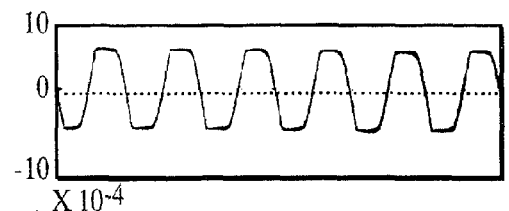
FIG. 16A  TRANSDUCER VOLTAGE
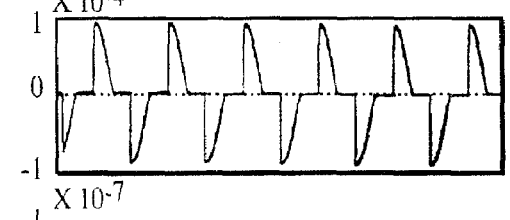
FIG. 16B  TRANSDUCER CURRENT
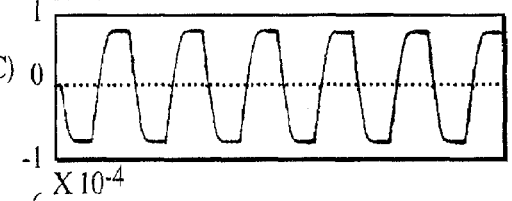
FIG. 16C  $Q_{TRANSDUCER}(C)$
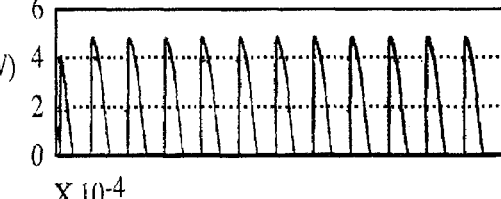
FIG. 16D  $P_{TRANSDUCER}(W)$
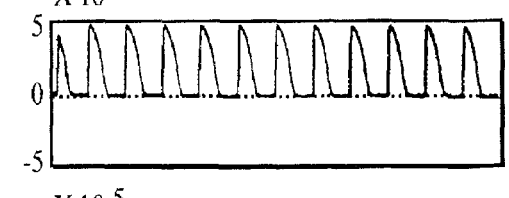
FIG. 16E  $P_{EXTRACT}(W)$
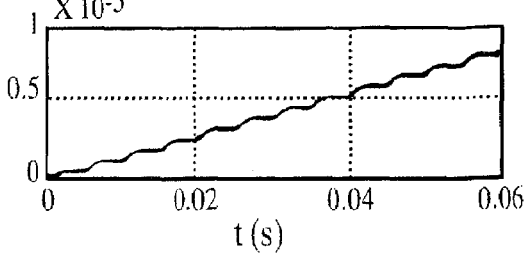
FIG. 16F  $E_{EXTRACT}(J)$

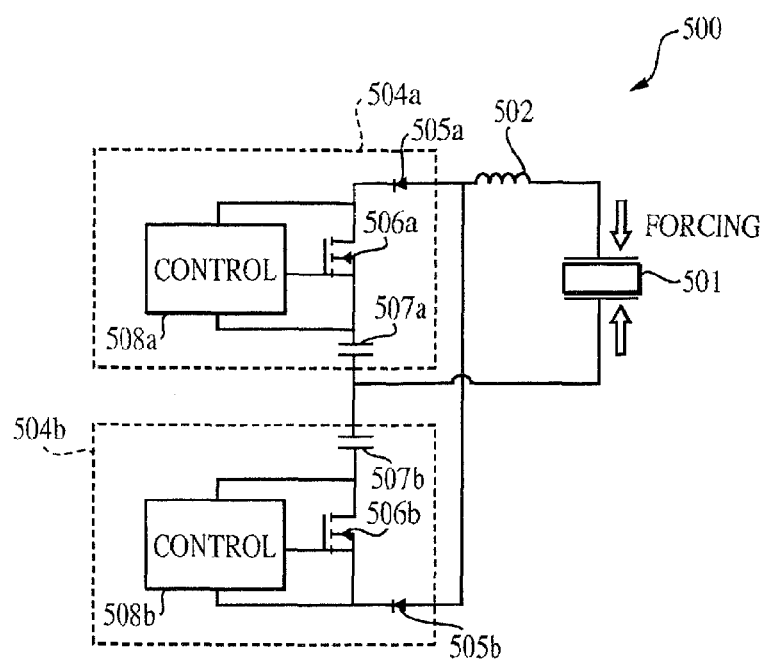
FIG. 19
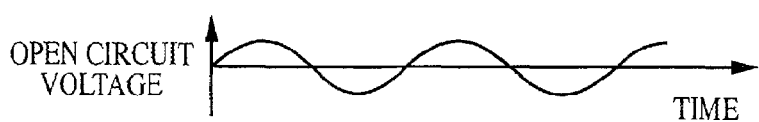
FIG. 20A
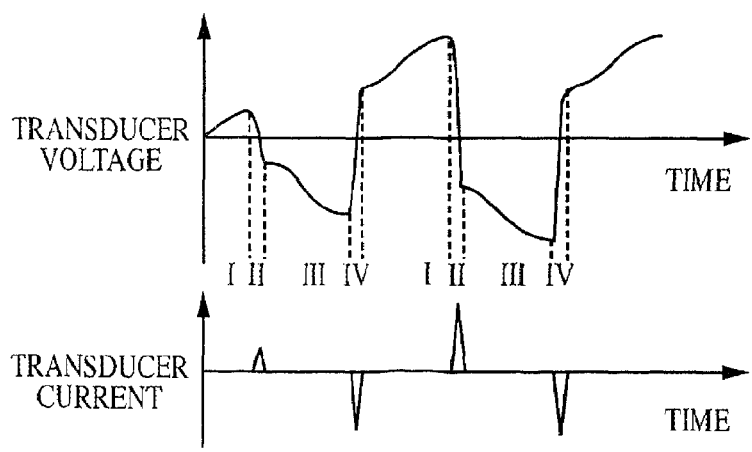
FIG. 20B
FIG. 20C

ELECTRICAL POWER EXTRACTION FROM MECHANICAL DISTURBANCES

This application claims priority from provisional application U.S. Ser. No. 60/158,538, filed Oct. 8, 1999, entitled ELELCTRICAL POWER EXTRACTION FROM MECHANICAL DISTURBANCES, and is a continuation-in-part of application U.S. Ser. No. 09/323,739, filed Jun. 1, 1999, now U.S. Pat. No. 6,580,177 entitled ELECTRICAL POWER EXTRACTION FROM MECHANICAL DISTURBANCES.

STATEMENT AS TO FEDERALLY SPONSORED RESEARCH

The U.S. Government has certain rights in the invention under Contract Number DAAH01-97-C-R 310 awarded by Defense Advanced Research Projects Agency (DARPA).

BACKGROUND OF THE INVENTION

The invention relates to extracting energy, and, more particularly, to extracting electrical power from a mechanical disturbance.

A transducer, for example, a piezoelectric transducer, which converts mechanical energy to electrical energy can be used to extract electrical power from a disturbance. It is known to use piezoelectric transducers to extract power from, for example, ocean waves.

SUMMARY OF THE INVENTION

A transducer, for example, a piezoelectric transducer, an antiferroelectric transducer, an electrostrictive transducer, a piezomagnetic transducer, a magnetostrictive transducer, or a magnetic shape memory transducer, can be used to convert energy in form of, for example, a mechanical disturbance, to electrical energy. Examples of sources of mechanical energy include: environmental sources such as wind, ocean waves, and earth motion; vibrating machinery such as rotating machinery, compressors, gears, and bearings; human motion such as walking, running, climbing, and hand gestures; human input such as by winding-up a device or shaking a device; vehicle motion such as automobile motion, aircraft motion, and satellite motion; movement of civil structures such as bridges and buildings; acoustic sources such as noise and speech; and impact on or motion of sports equipment.

Electrical power extracted from, for example, human locomotion, can be used to power any device where portable power is needed, for example, personal consumer electronics such as cell phones, pagers, personal organizers, and portable tape players, CD players, and radios. Electrical power extracted from, for example, a vibrating structure such as a tennis racket (or any other sporting equipment), can be used to self-power the transducer and supporting electronics for use of the transducer as a vibration suppression actuator, or to power sensors on the sporting equipment or other special effects. Power extracted from, for example, machinery motion, can be used to self-power the transducer for use as a vibration suppression actuator or to provide power for a remote sensor and wireless telemetry in, for example, condition based maintenance of machinery and structures.

According to one aspect of the invention, a method of extracting power includes coupling a transducer that converts mechanical power to electrical power to a disturbance; coupling an electrical circuit to the transducer such that a peak voltage experienced by the transducer is greater than two times higher than any peak voltage of an open circuit transducer due to the disturbance alone; extracting power from the transducer using the electrical circuit, and storing extracted power.

Embodiments of this aspect of the invention may include one or more of the following features.

The stored extracted power is applied to an external load. Coupling the electrical circuit includes applying stored extracted power to the transducer. Coupling the electrical circuit includes coupling a resonant circuit to the transducer. Coupling the electrical circuit includes controlling switches electrically connected to the transducer. A system state is monitored and the switches are controlled based on the system state. The duty cycle of the switches is controlled.

Coupling the electrical circuit can act to increase oscillations of the disturbance. Alternatively, coupling the electrical circuit can act to dampen oscillations of the disturbance. Coupling the electrical circuit includes powering the electrical circuit with power extracted from the disturbance.

In one illustrated embodiment, a plurality of transducers are coupled to the disturbance. Coupling the transducer includes attaching the transducer to a structure.

According to another aspect of the invention, a method of extracting power includes coupling a transducer that converts mechanical power to electrical power to a disturbance; coupling an electrical circuit to the transducer such that a peak of the integral of the current onto and off the transducer is greater than two times higher than any peak of an integral of a current of a short circuit transducer due to the disturbance alone; extracting power from the transducer using the electrical circuit; and storing extracted power.

According to another aspect of the invention, a method of extracting power includes coupling a transducer that converts mechanical power to electrical power to a disturbance; measuring a mechanical state with a sensor, controlling an electrical circuit coupled to the transducer based on the measured mechanical state; extracting power from the transducer using the electrical circuit; and storing extracted power.

According to another aspect of the invention, a method of extracting power includes coupling a transducer that converts mechanical power to electrical power to a disturbance; controlling switches of an electrical circuit coupled to the transducer such that the switches switch at a frequency greater than two times an excitation frequency of the disturbance; extracting power from the transducer using the electrical circuit; and storing extracted power.

According to another aspect of the invention, a method of extracting power includes coupling a transducer that converts mechanical power to electrical power to a mechanical disturbance; extracting power from the transducer and applying power to the transducer during different intervals in the course of the disturbance; and storing extracted power.

Embodiments of this aspect of the invention may include one or more of the following features.

The step of extracting power from the transducer and applying power to the transducer occurs in a single cycle. The step of extracting power from the transducer and applying power to the transducer includes the use of a resonant circuit or amplifier electronics.

According to another aspect of the invention, a system for extracting power includes a transducer that converts mechanical power to electrical power, an electrical circuit, and a storage element for storing extracted power. The transducer is configured for coupling to a disturbance. The electrical circuit is connected across the transducer such that a peak voltage experienced by the transducer is greater than two times higher than any peak voltage of an open circuit transducer due to the disturbance alone.

Embodiments of this aspect of the invention may include one or more of the following features.

The circuit includes a resonant circuit and a rectification circuit. Alternatively, the circuit includes amplifier electronics, for example, arranged as a H-bridge or a half bridge. Control electronics control the amplifier electronics. The control electronics control a duty cycle of the amplifier electronics. The electrical circuit includes a sensor for monitoring a system state used to control the electrical circuit.

The electrical circuit includes an inductor with first and second terminals. The first terminal of the inductor is connected to a first terminal of the transducer. A first subcircuit is connected to the second terminal of the inductor and a second terminal of the transducer. The first subcircuit includes a switch. A second subcircuit is connected to the second terminal of the inductor and the second terminal of the transducer. The second subcircuit including a switch.

In an illustrated embodiment, the electrical circuit includes a rectifier circuit having first and second input terminals and first and second output terminals. The first and second input terminals are connected across first and second terminals of the transducer. An inductor includes first and second terminals. The first terminal of the inductor is connected to the first output terminal of the rectifier circuit. A subcircuit including a switch is connected to the second terminal of the inductor and the second output terminal of the rectifier circuit.

The storage element is, for example, a capacitor or rechargeable battery. The storage element can include two components connected in series; a side of the transducer is connected to a node between the two components. The storage element and the electrical circuit are connected such that the storage element supplies power to the electrical circuit. An independent power source supplies power to the electrical circuit.

According to another aspect of the invention, a system for extracting power includes a transducer that converts mechanical power to electrical power, an electrical circuit, and a storage element for storing extracted power. The transducer is configured for coupling to a disturbance. The electrical circuit is connected across the transducer such that a peak of the integral of the current onto and off the transducer is greater than two times higher than any peak of an integral of a current of a short circuit transducer due to the disturbance alone.

According to another aspect of the invention, a system for extracting power includes a transducer that converts mechanical power to electrical power, an electrical circuit, control logic, and a storage element for storing extracted power. The transducer is configured for coupling to a mechanical disturbance. The electrical circuit includes switching electronics connected across the transducer. The control logic switches the switching electronics at a frequency greater than two times an excitation frequency of the disturbance.

Embodiments of this aspect of the invention may include one or more of the following features.

A sensor measures a system state, and the operation of the controlled switches is based on the measured system state. The control logic controls the switching electronics. The duty cycle of the switching electronics is controlled.

According to another aspect of the invention, a system for extracting power includes a transducer that converts mechanical power to electrical power, an electrical circuit, and a storage element for storing extracted power. The transducer is configured for coupling to a disturbance. The electrical circuit is connected across the transducer and is capable of extracting power from the transducer and applying power to the transducer during different intervals in the course of the disturbance.

According to another aspect of the invention, a method for extracting power includes coupling a transducer that converts mechanical power to electrical power to a disturbance; coupling a resonant circuit to the transducer; and coupling a rectifier to the resonant circuit. Extracted electrical power is used to directly power an external application.

According to another aspect of the invention, a system for extracting power includes a transducer that converts mechanical power to electrical power. The transducer is configured for coupling to a disturbance. A resonant circuit is coupled to the transducer, and a rectifier is coupled to the resonant circuit. Extracted electrical power is used to directly power an external application.

According to another aspect of the invention, a system for extracting power includes a transducer that converts mechanical power to electrical power. The transducer is configured for coupling to a disturbance. A passive voltage doubling rectifier is connected across the transducer. Alternatively, a N-stage parallel fed voltage multiplier is connected across the transducer.

According to another aspect of the invention, a method of damping the vibrations in a disturbance, for example vibrating machinery, or sporting good, includes coupling a transducer that converts mechanical power to electrical power to the disturbance; coupling an electrical circuit to the transducer such that the peak voltage experienced by the transducer is greater than two times higher than any peak voltage of an open circuit transducer due to the disturbance alone; extracting power from the transducer using the electrical circuit; and storing or dissipating the extracted power.

According to another aspect of the invention, a system for extracting power includes a transducer that converts mechanical power to electrical power. The transducer is configured for coupling to a disturbance. A sensor measures a mechanical state, and an electrical circuit coupled to the transducer is controlled based on the measured mechanical state. The electrical circuit is configured to extract power from the transducer and store extracted power.

According to another aspect of the invention, a method includes the steps of coupling a transducer that converts mechanical power to electrical power to a disturbance, and coupling an electrical circuit to the disturbance. Coupling the electrical circuit includes controlling switches such that all power supplied to the transducer is derived from power extracted from the mechanical disturbance.

Embodiments of this aspect of the invention may include one or more of the following features.

Power for the entire circuit is derived from power extracted from the mechanical disturbance. Alternatively, part of the circuit is powered by an external source, for example, a battery.

According to another aspect of the invention, a system includes a transducer that converts mechanical power to electrical power. The transducer is configured for coupling to a disturbance. An electrical circuit is connected across the transducer. The electrical circuit contains active switches such that all power supplied to the transducer is derived from power extracted from the mechanical disturbance.

BRIEF DESCRIPTION OF THE DRAWINGS

Other objects, features and advantages of the invention will be apparent from the following description, taken together with the drawings, in which:

FIG. 15 is a circuit diagram of a passive rectifier power extraction system;

FIGS. 16A–16F are various voltage, current, power, and energy waveform diagrams of the circuit of FIG. 15;

FIG. 19 is a circuit diagram of an alternative embodiment of a power extraction system;

FIGS. 20A–20C are voltage and current versus time graphs;

DESCRIPTION OF THE PREFERRED EMBODIMENTS

Figure 1A:
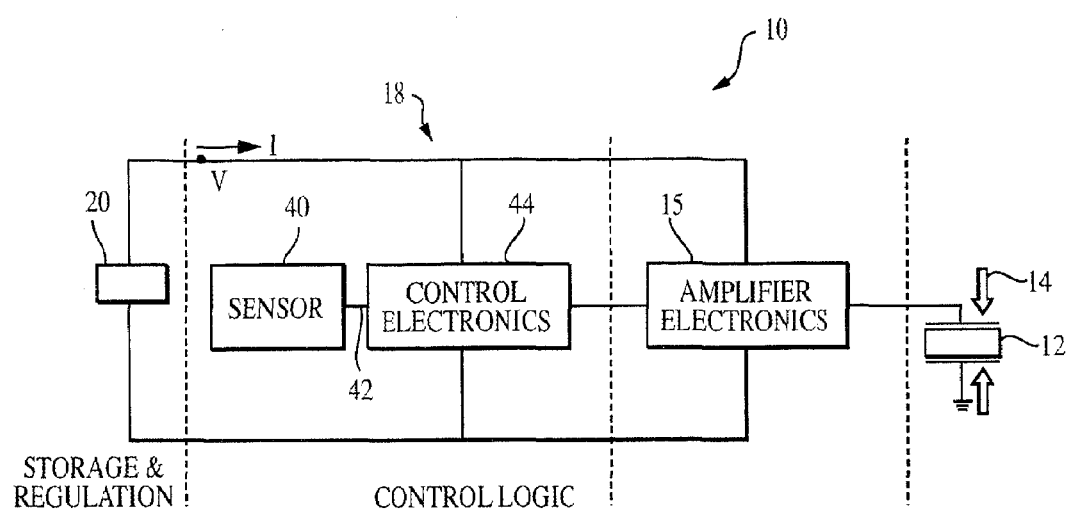
FIG. 1A is a block diagram of a power extraction system.

Referring to FIG. 1A, an electronic circuit 10 for extracting electrical power from a transducer 12 acted upon by a disturbance 14 includes amplifier electronics 15, for example, any amplifier that allows bi-directional power flow to and from transducer 12 such as a switching amplifier, a switched capacitor amplifier, or a capacitive charge pump; control logic 18; and a storage element 20, for example, a rechargeable battery, capacitor or combination thereof. Amplifier electronics 15 provides for flow of electrical power from transducer 12 to storage element 20, as well as from storage element 20 to transducer 12.

Figure 1B:
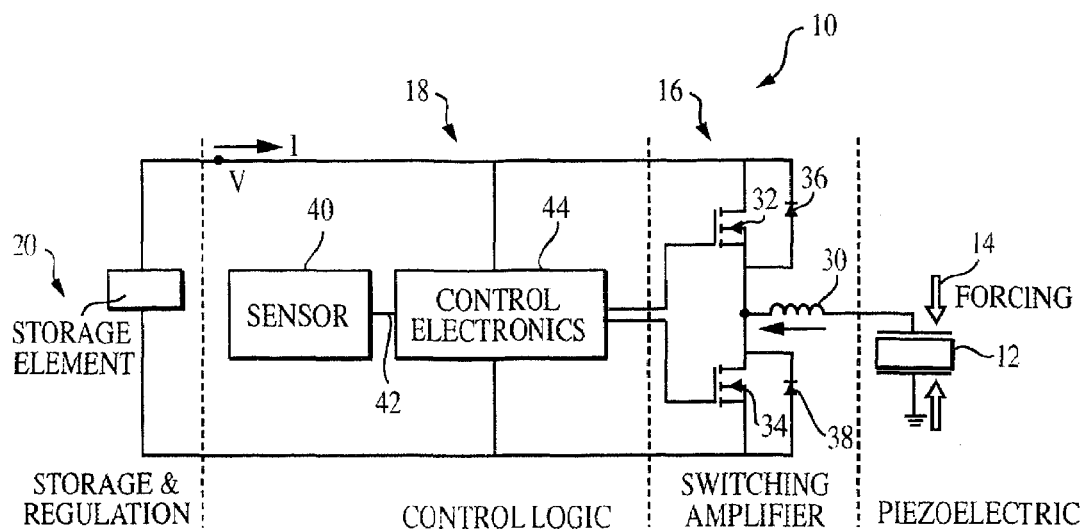
FIG. 1B is a circuit diagram of a particular embodiment of the power extraction system of FIG. 1A.

Referring to FIG. 1B, a switching amplifier 16 includes switches, for example, MOSFETs 32, 34, bipolar transistors, IGBTs, or SCRs, arranged in a half bridge, and diodes 36, 38. (Alternatively the switches can be bidirectional with no diodes.) MOSFETs 32, 34 are switched on and off at high frequencies of, for example, between about 10 kHz–100 kHz. Switching amplifier 16 connects to transducer 12 through an inductor 30. The value of inductor 30 is selected such that inductor 30 is tuned below the high frequency switching of MOSFETs 32, 34 and above the highest frequency of importance in the energy of disturbance 14 with inductor 30 acting to filter the high frequency switching signals of circuit 16.

The current flow through inductor 30 is determined by the switching of MOSFETs 32, 34 and can be divided into four phases:

Phase I: MOSFET 32 is off, MOSFET 34 is switched on, the current in inductor 30 increases as the inductor stores energy from transducer 12.

Phase II: MOSFET 34 is turned off and MOSFET 32 is switched on, the current is forced through diode 36 and onto storage element 20 as inductor 30 releases the energy.

Phase III: As the current in inductor 30 becomes negative the current stops flowing through diode 36 and flows through MOSFET 32, and energy from storage element 20 is transferred to inductor 30.

Phase IV: MOSFET 32 is then turned off and MOSFET 34 is turned on, current flowing through diode 38 increases, and the energy stored in inductor 30 is transferred to transducer 12.

Figure 2A:
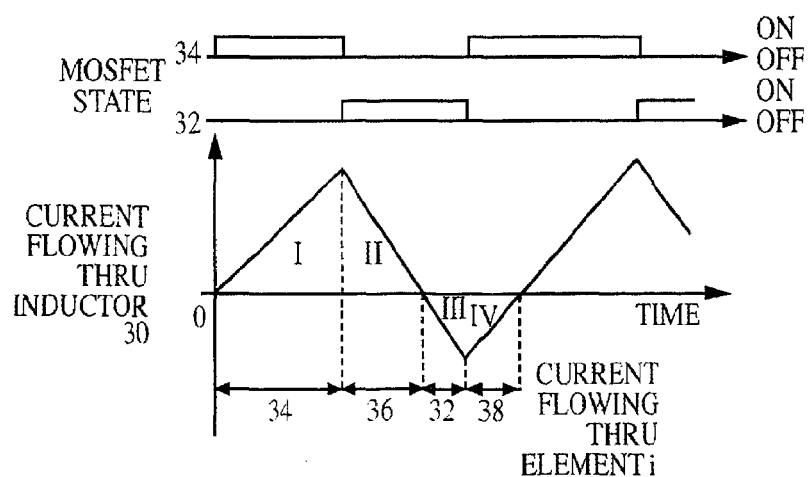
FIG. 2A is a graph of the phases of current flow through an inductor of the circuit of FIG. 1B.
Figure 2B:
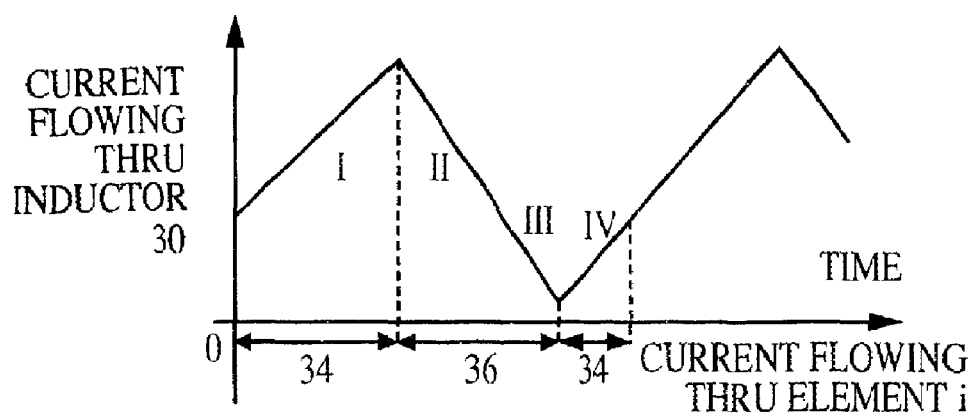
FIGS. 2B and 2C show alternative current flows through the inductor.
Figure 2C:
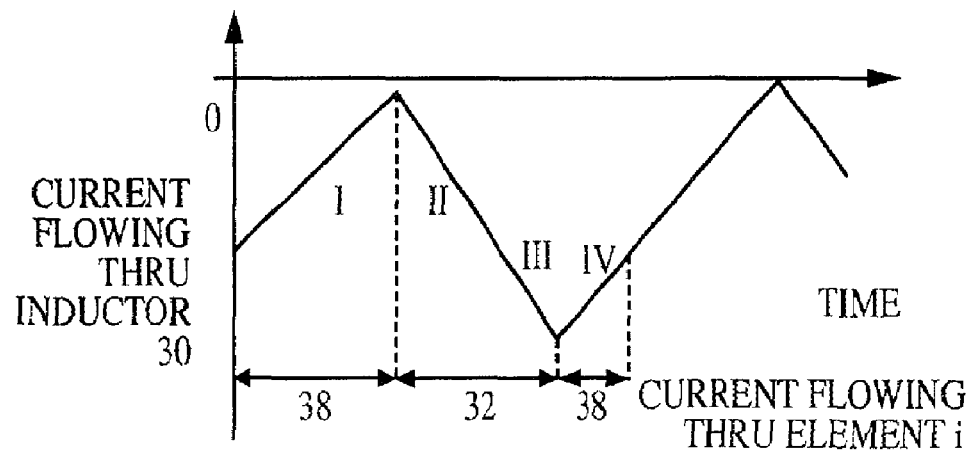

FIG. 2A is a graphical representation of the four phases showing (i) the current through inductor 30 versus time, (ii) which MOSFET or diode current is flowing through in each phase, and (iii) the state of the MOSFETs in each phase. The net current during the switching phases may be positive or negative depending on the state of the disturbance and the duty cycle of the switches. Referring to FIG. 2B, the current may be positive during all four phases in which case the current flows through switch 34 and diode 36. Alternatively, referring to FIG. 2C, the current may be negative during all four phases, in which case the current flows through switch 32 and diode 38.

MOSFET 32 can be off during phase II, and MOSFET 34 can be off during phase IV without affecting the current flow since no current flows through these MOSFETs during the respective phases. If MOSFETs 32, 34 are on during phases II and IV, respectively, a deadtime can be inserted between the turning off of one MOSFET and the turning on of another MOSFET to reduce switching losses from cross conductance across MOSFETs 32, 34.

Figure 3A:
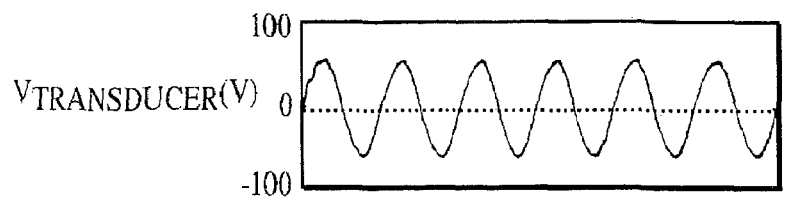
FIGS. 3A–3G are various voltage, current, power, and energy waveform diagrams of the circuit of FIG. 1B.
Figure 3B:
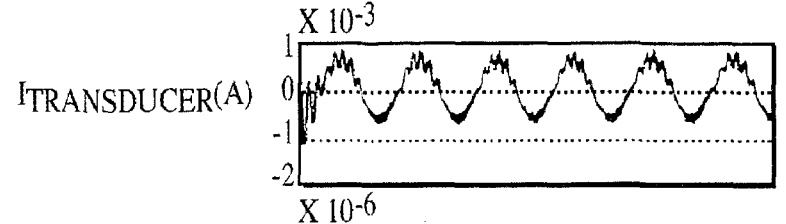
Figure 3C:
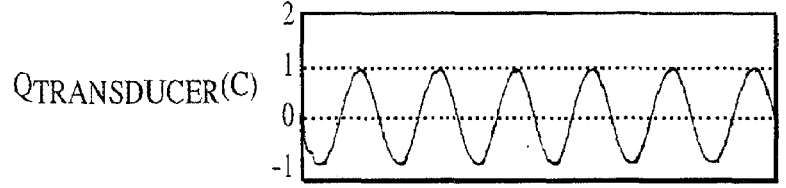
Figure 3D:
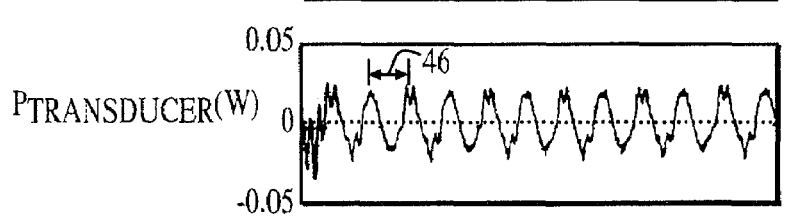
Figure 3E:
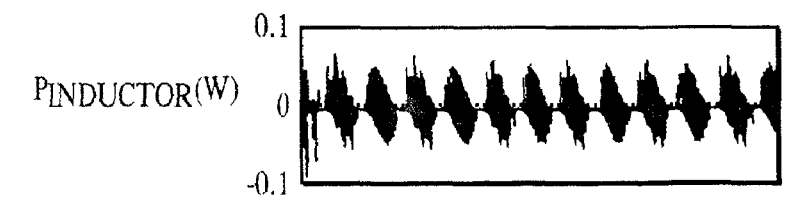
Figure 3F:
Figure 3G:
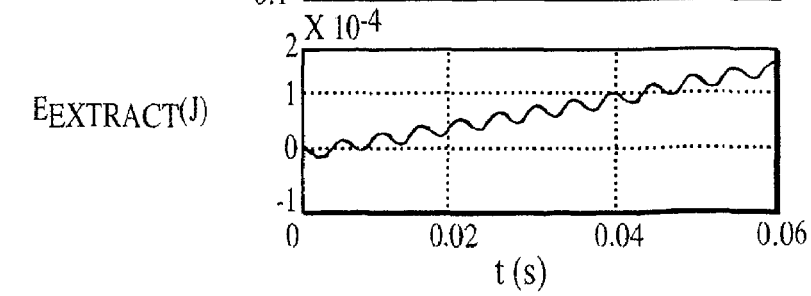
Figure 4A:
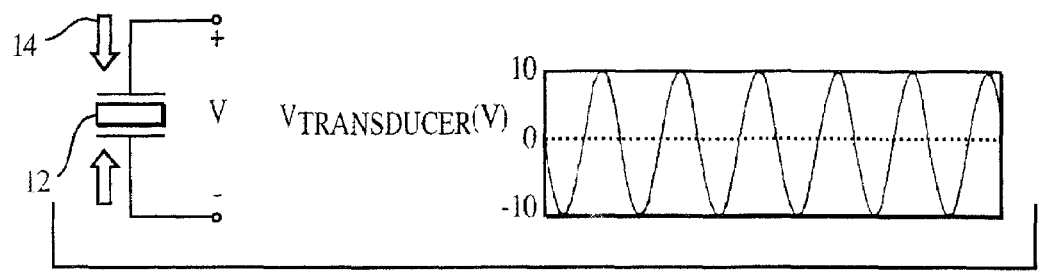
FIG. 4A is a waveform of the voltage across an open circuit transducer.

Referring to FIGS. 3A–3G, an example of the power extracted from transducer 12 is graphically represented where the amplitude of the voltage across an open circuit transducer would have been 10 volts (see FIG. 4A). In this example, transducer 12 is a PZT-5H piezoelectric transducer with a thickness of 2 mm and an area of 10 cm$^2$. The properties of this transducer are: compliance $S^E_{33}=2.07\times10^{-11}$ m$^2$/N, dielectric $\epsilon^T_{33}/\epsilon_o=3400$, and coupling coefficient $d_{33}=593\times10^{-12}$ m/V. The capacitance of this transducer is 15 nF. The following waveforms correspond to a 100 Hz sinusoidal disturbance with an amplitude of 250 N through the thickness direction, which would produce an open circuit voltage of 10 V on the transducer.

Figure 4B:
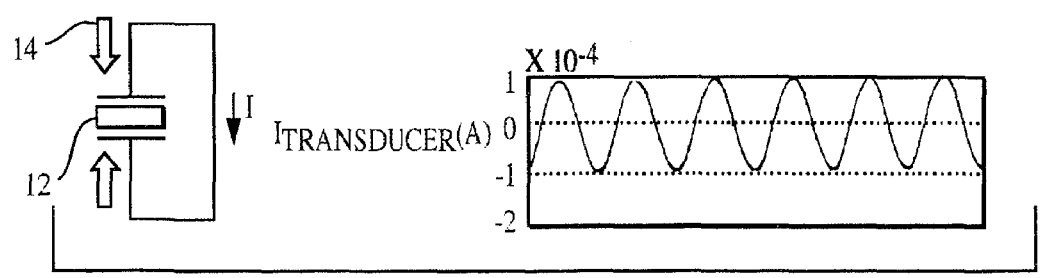
FIG. 4B is a waveform of the current passing through a short circuit transducer.
Figure 4:
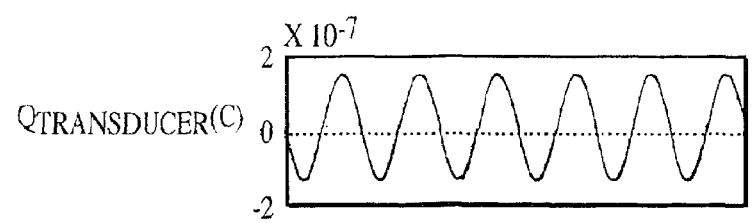
FIG. 4C is a waveform of the charge passing through a short circuit transducer.

FIG. 3A shows the voltage across transducer 12 as a function of time. The peak amplitude of the voltage is greater than twice any peak voltage of an open circuit transducer. Here, the peak amplitude of the voltage is about 60 volts. FIG. 3B shows the current waveform on transducer 12 and FIG. 3C the charge waveform on transducer 12. Due to the flow of current from storage element 20 to transducer 12, the peak of the integral of the current onto and off transducer 12 is greater than two times higher than any peak of an integral of a current of a short circuit transducer due to the disturbance alone (see FIGS. 4B and 4C).

Due to the phasing of the voltage and current waveforms, the power to and from transducer 12, FIG. 3D, alternates between peaks of about 0.021 Watts and −0.016 Watts. Thus, power flows to transducer 12 from storage element 20 and from transducer 12 to storage element 20 during the course of disturbance 14 on transducer 12, for example, during a single sinusoidal cycle 46, with the net power flowing from transducer 12 to storage element 20. The cycle need not be sinusoidal, for example, where the disturbance has multiple frequency harmonics or broad frequency content such as in a square wave, a triangular wave, a saw tooth wave, and white noise bandwidth limited or otherwise.

The power into inductor 30 is shown in FIG. 3E. The high frequency switching of MOSFETs 32, 34, described above, is seen in the power waveform. Where the waveform is positive, power is being stored in inductor 30, and where the waveform is negative, power is being discharged from inductor 30.

The extracted power and energy are shown in FIGS. 3F and 3G. Over a period of 0.06 seconds, approximately $1.5\times10^{-4}$ Joules of energy are extracted. An advantage of circuit 10 is that a higher peak voltage and peak charge are seen by the transducer than would otherwise occur and thus higher power can be extracted from the input disturbance. By applying a voltage to transducer 12 having an appropriate amplitude and phasing relative to disturbance 14, transducer 12 will undergo more mechanical deflection under the load than would otherwise occur. Thus, more work is done on transducer 12 by disturbance 14 and more energy can be extracted by circuit 10.

Referring again to FIG. 1B, the duty cycle of MOSFETs 32, 34 is controlled by measuring the motion of disturbance 14 and selecting a time-varying duty cycle to match the motion of disturbance 14. This provides for effective power extraction over a wide frequency range of the disturbance. Control logic 18 includes a sensor 40, for example, a strain gage, micropressure sensor, PVDF film, accelerometer, or composite sensor such as an active fiber composite sensor, which measures the motion or some other property of disturbance 14, and a control electronics 44. Sensor 40 supplies a sensor signal 42 to control electronics 44 which drive MOSFETs 32, 34 of switching amplifier 16. System states which sensor 40 can measure include, for example, vibration amplitude, vibration mode, physical strain, position, displacement, acceleration, electrical or mechanical states such as force, pressure, voltage or current, and any combination thereof or rate of change of these, as well as temperature, humidity, altitude, or air speed orientation. In general any physically measurably quantity which corresponds to a mechanical or electrical property of the system.

Possible control methods or processes for determining the duty cycle of MOSFETs 32, 34 include rate feedback, positive position feedback, position-integral-derivative feedback (PID), linear quadratic Gaussian (LQG), model based controllers, or any of a multitude of dynamic compensators.

For the example described above with reference to FIGS. 3A–3G, with a disturbance of 100 Hz, a switching frequency of 100 kHz was used. An inductor value of 1.68H was selected such that the time constant of inductor 30 and transducer 12 corresponds to 1,000 Hz. The duty cycle of MOSFETs 32, 34 was controlled using rate feedback. The voltage on storage element 20 was set to 60 volts.

Referring to FIG. 1A, in other alternative control methods or processes for extracting power from transducer 12, the duty cycle of controlled switches in circuit 15 is specified based on the governing equations for a Boost or Buck converter such that the transducer voltage is stepped up or down to the voltage on the storage element. The Boost converter allows extraction of power from transducer 12 when the open circuit voltage developed across transducer 12 is lower than the voltage on storage element 20. The Buck converter allows efficient extraction of power from transducer 12 when the open circuit voltage developed across transducer 12 is higher than the voltage on storage element 20.

The control methods or processes can include a shut down mode of operation such that when the magnitude of the voltage across transducer 12 is below a certain limit, MOSFETs 32, 34 and portions of the supporting electronics are turned off to prevent unnecessary dissipation of power from storage element 20. Alternatively, MOSFETs 32, 34 can be shut down when the duty cycle required by the control method is above or below a certain threshold.

Figure 5:
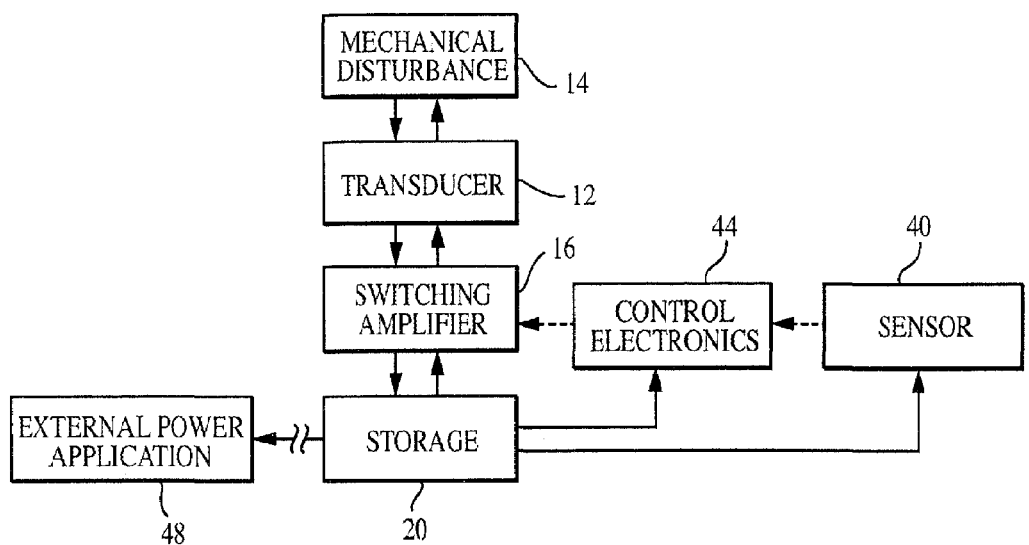
FIG. 5 is a block diagram of the power extraction system of FIG. 1B.

FIG. 5 shows the flow of power between disturbance 14 and storage element 20, and the flow of information (dashed lines). The power from mechanical disturbance 14 is transferred to transducer 12 which converts the mechanical power to electrical power. The power from transducer 12 is transferred to storage element 20 through switching amplifier 16. Power can also flow from storage element 20 to transducer 12 through switching amplifier 16. Transducer 12 can then convert any received electrical power to mechanical power which in turn acts upon a structure 50 (FIG. 6) creating disturbance 14. The net power flows to storage element 20.

The power for sensor 40 and control electronics 44 as well as the cyclic peak power needed by transducer 12 is supplied by the energy accumulated in storage element 20, which has been extracted from disturbance 14. Energy accumulated in storage element 20 can also or alternatively be used to power an external application 48 or the power extraction circuitry itself.

Losses in the system include losses in energy conversion by transducer 12, losses due to voltage drops at diodes 36, 38 and MOSFETs 32, 34, switching losses, and losses due to parasitic resistances or capacitances through circuit 10.

The control methods or processes can vary dependent upon whether maximum power generation is desired or self-powering of a transducer acting as a vibration damping actuator is desired. When maximum power generation is desired a feedback control loop uses the signal from sensor 40 to direct MOSFETs 32, 34 to apply a voltage to transducer 12 which acts to increase the mechanical work on transducer 12 contracting and expanding transducer 12 in phase with disturbance 14 essentially softening transducer 12 to disturbance 14. More energy is extracted from disturbance 14, however vibration of the structure 50 (FIG. 6) creating disturbance 14 may be increased.

When transducer 20 is being used to dampen vibration of mechanical disturbance 14, a feedback control loop uses the signal from sensor 40 to adjust the duty cycle of MOSFETs 32, 34 to apply a voltage to transducer 12 which will act to damp the vibrations. The system provides self-powered vibration dampening in that power generated by transducer 12 is used to power transducer 12 for dampening.

Figure 6:
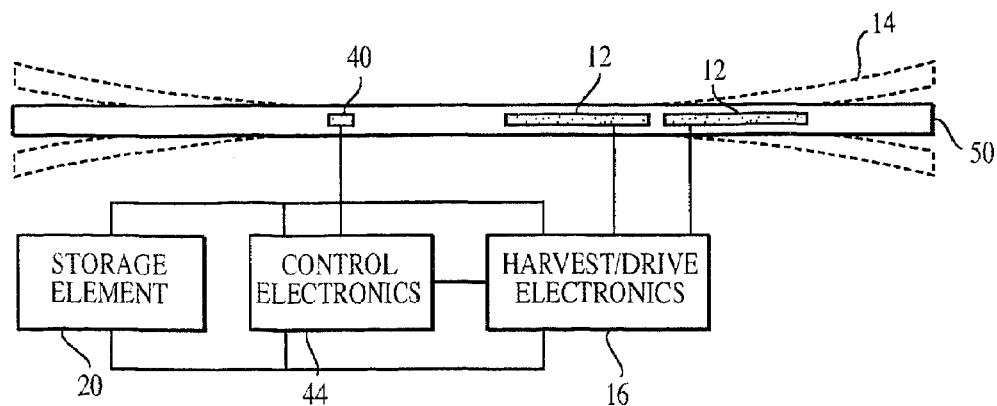
FIG. 6 shows an implementation of the power extraction system of FIG. 1B with a transducer of the system mounted to a structure.

Referring to FIG. 6, one or more transducers 20 can be attached, e.g., bonded, embedded, latched, riveted, etc., to one or more locations on a structure, e.g., aircraft fuselage 50, and connected to one harvesting/drive circuit 16 (or more than one harvesting/drive circuit). Any mechanical connection which can transmit loads and/or deflections of a mechanical disturbance to transducer 12 can be used. Movement of fuselage 50 creates mechanical disturbance 14 on transducer 12. Other mechanical interfaces for transferring a mechanical input to transducer 20 other than direct attachment to a structure include the use of a mechanical amplifier or hydraulic amplifier, where a mechanical disturbance external to the mechanical interface is coupled to transducer 12. An example is a Moonie® configuration which transforms an external hydrostatic pressure to a disturbance which acts in a preferential fashion on transducer 12 to maximize the voltage or current response to the mechanical disturbance.

Transducer 12 is, for example, a piezoelectric transducer, an antiferroelectric transducer, an electrostrictive transducer, a piezomagnetic transducer, a magnetostrictive transducer, or a magnetic shape memory transducer. Examples of piezoelectric transducers include polycrystaline ceramics such as PZT 5H, PZT 4, PZT 8, PMN-PT, fine grain PZT, and PLZT; polymers such as electrostrictive and ferroelectric polymers, for example, PVDF and PVDF-TFE; single crystal ferroelectric materials such as PZN-PT, PMN-PT, NaBiTi-BaTi, and BaTi; and composites of these materials such as active fiber composites and particulate composites, generally with 1-3, 3-3, 0-3 or 2-2 connectivity patterns.

Possible mechanical configurations of transducer 12 include a disk or sheet in through thickness (33) mode, in transverse (31) or planar (p) mode, or shear (15) mode, single or multilayer, bimorph, monomorph, stack configuration in through thickness (33) mode, rod or fiber poled transverse or along fiber, ring, cylinder or tube poled radially, circumferentially or axially, spheres poled radially, rolls, laminated for magnetic systems. Transducer 12 can be integrated into a mechanical device which transform forces/pressures and deformation external to the device into appropriate, advantageous forces/pressures and deformation on transducer 12.

Disturbance 14 can be an applied force, an applied displacement, or a combination thereof. For a disturbance applied to transducer 12 in the 33 direction, if the system is designed specifying the stress amplitude on transducer 12, the material from which transducer 12 is formed should be selected which maximizes $k_{gen}^2 s_{gen}^E$, for example, $k_{33}^2 s_{33}^E$.

If the system is designed specifying the strain on transducer 12, a material should be selected which maximizes $k_{gen}^2/s_{gen}^D$, for example, $k_{33}^2/s_{33}^D$. Where $k_{gen}$ is the effective material coupling coefficient for the particular generalized disturbance on transducer 12, $S_{gen}^E$ is the effective compliance relating the generalized disturbance or displacement of the transducer in the short circuit condition, and $s_{gen}^D$ is the effective compliance relating the generalized disturbance or displacement of the transducer in an open circuit condition.

Figure 7:
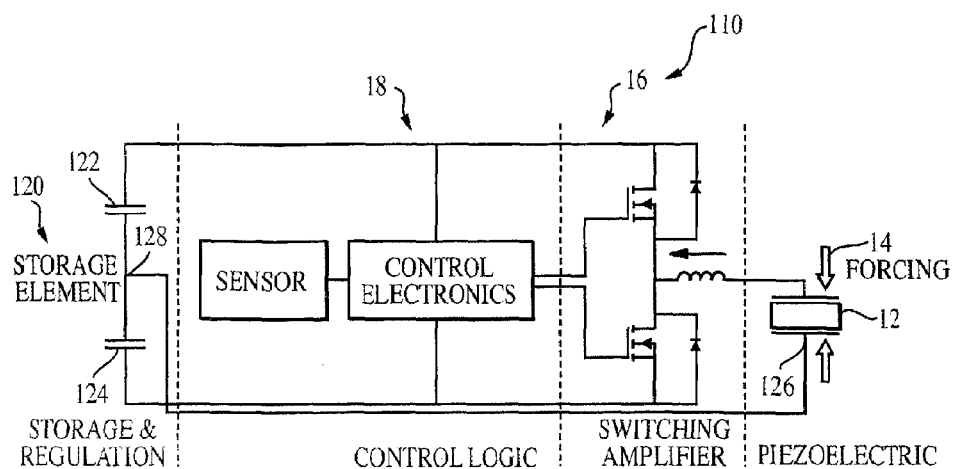
FIG. 7 is a circuit diagram of an alternative embodiment of a power extraction system.

Referring to FIG. 7, in a preferred embodiment, a circuit 110 for extracting power from transducer 12 includes a storage element 120 which includes two storage components 122, 124 connected in series. One side 126 of transducer 12 is connected to a middle node 128 of components 122, 124. This connection biases transducer 12, permitting operation of circuit 110 when the voltage on transducer 12 is positive or negative.

Figure 8:
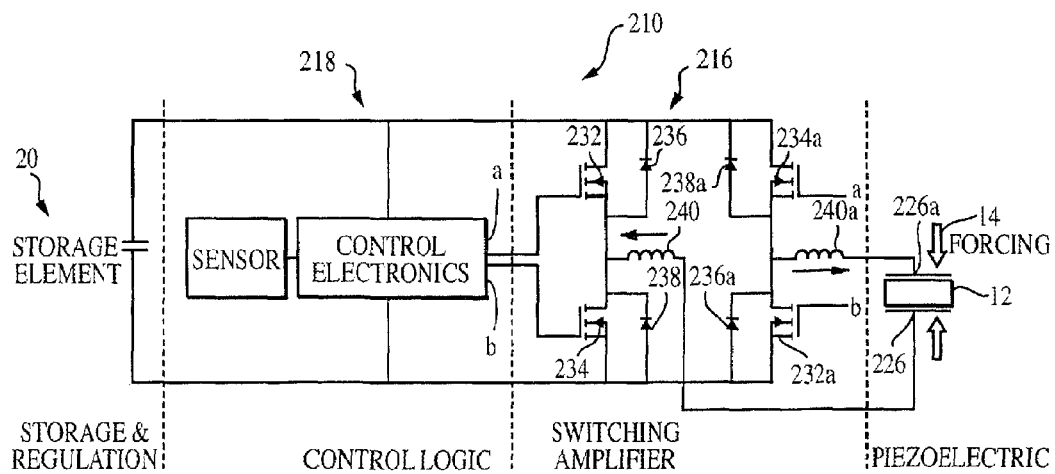
FIG. 8 is a circuit diagram of an additional alternative embodiment of a power extraction system.

Referring to FIG. 8, a circuit 210 includes an H-bridge switching amplifier 216. In a first approach, control logic 218 operates MOSFETs 232, 232a together, and MOSFETs 234, 234a together:

Phase I: MOSFETs 232, 232a are off, MOSFETs 234, 234a are turned on, current flows through MOSFETs 234, 234a, and energy from transducer 12 is stored in inductors 240, 240a.

Phase II: MOSFETs 234, 234a are turned off and MOSFETs 232, 232a are switched on, current flows through diodes 236, 236a, and the energy stored in inductors 240, 240a is transferred to storage element 20.

Phase III: As the current becomes negative, the current stops flowing through diodes 236, 236a and flows through MOSFETs 232, 232a, and energy from storage element 20 is transferred to inductors 240, 240a.

Phase IV: MOSFETs 232, 232a are turned off, current flowing through diodes 238, 238a increases, and the energy stored in inductors 240, 240a is transferred to transducer 12.

In a second operational approach, only half of the H-bridge is operated at any given time, depending upon the polarity of the voltage desired on transducer 12. When a positive voltage is desired, MOSFET 234a is turned off and MOSFET 232a is tuned on, grounding side 226a of transducer 12. MOSFETs 232 and 234 are then turned on and off as described above with reference to FIG. 2, to affect the voltage on side 226 of transducer 12. When a negative voltage on transducer 12 is desired, MOSFET 232 is turned off and MOSFET 234 is turned on, grounding side 226 of transducer 12. MOSFETs 232a and 234a are then turned on and off as described above with reference to FIG. 2, to affect the voltage on side 226a of transducer 12.

Figure 9:
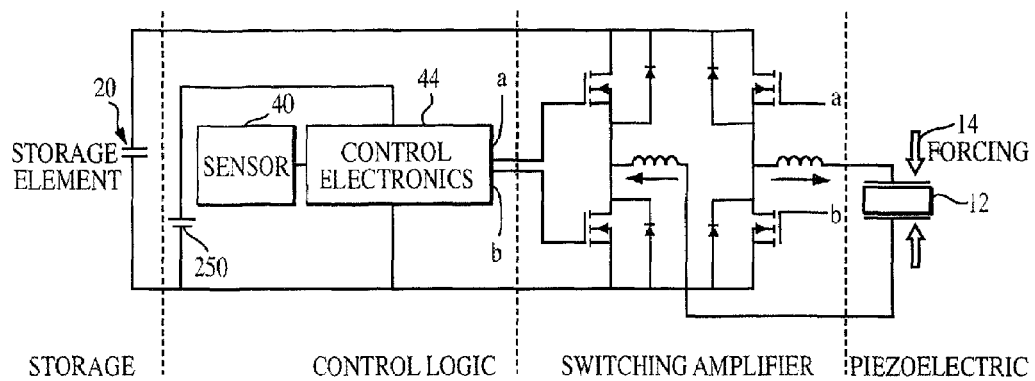
FIG. 9 is a circuit diagram of an additional alternative embodiment of a power extraction system.

Referring to FIG. 9, the circuit of FIG. 8 has been modified by including an independent power source, for example, a battery 250, which powers sensor 40 and control electronics 44. Storage element 20 still stores power to be transferred to and received from transducer 20.

Figure 10A:
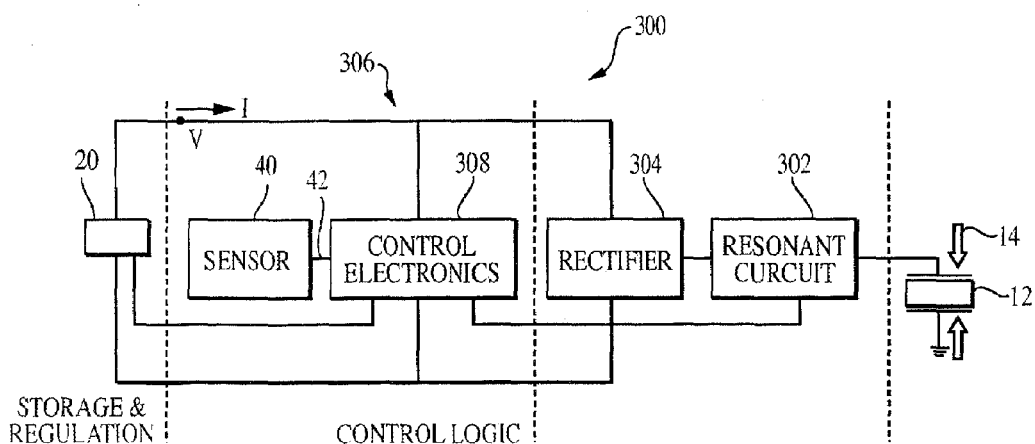
FIG. 10A is a block diagram of a power extraction system including a resonant circuit and a rectifier.

Referring to FIG. 10A, a simplified, resonant power extracting circuit 300 can be employed in place of amplifier electronics 15 for extracting power from transducer 12. Circuit 300 includes a resonant circuit 302, a rectifier 304, control logic 306, and a storage element 20, for example, a rechargeable battery or capacitor. Resonant circuit 302 includes elements such as capacitors and inductors which when coupled to the transducer produce electrical resonances in the system. Resonant circuit 302 provides for flow of electrical power from and to transducer 12. Sensor 40 and control electronics 308 can be used to adapt the voltage level of storage element 20 using, for example, a shunt regulator, or tune the resonant circuit by switching on different inductors or capacitors within a bank of components with different values.

Figure 10B:
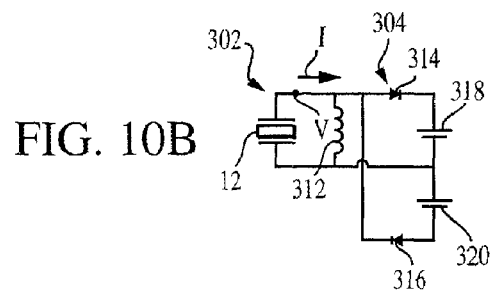
FIG. 10B is a circuit diagram of a particular embodiment of the power extraction system of FIG. 10A.

For example, referring to FIG. 10B, a piezoelectric transducer 12 is connected to a resonant circuit 302 formed by an inductor 312. Resonant circuit 302 is effective in a narrow frequency band dependent upon the value of inductor 312. The value of inductor 312 is selected such that the resonant frequency of the capacitance of transducer 12 and the inductance of inductor 312 is tuned to or near the dominant frequency, frequencies or range of frequencies of disturbance 14 or the resonance of the mechanical system. Rectifier 304 is a voltage doubling rectifier including diodes 314, 316. Power extracted from transducer 12 is stored in storage elements 318, 320.

For a magnetostrictive transducer 12, the resonant circuit 302 can include a capacitor connected in parallel with transducer 12.

The amplitude of the voltage across inductor 312 grows as a result of resonance until the voltage is large enough to forward bias one of diodes 314, 316. This occurs when the voltage across inductor 312 is greater than the voltage across one of storage elements 318, 320.

In the case of a sinusoidal disturbance, the current flow through circuit 310 can be described in four phases:

Phase I: As the transducer voltage increases from zero, no current flows through diodes 314, 316 while the transducer voltage is less than the voltage on storage elements 318, 320.

Phase II: When the transducer voltage grows larger than the voltage on storage element 318, diode 314 becomes forward biased, and current flows through diode 314 into storage element 318.

Phase III: As the transducer voltage drops, diodes 314, 316 are reverse-biased and again no current flows through the diodes.

Phase IV: When the transducer voltage goes negative and has a magnitude greater than the voltage on storage element 320, diode 316 becomes forward biased, and current flows through diode 316 into storage element 320. As the transducer voltage begins to increase, diodes 314, 316 are reverse-biased again and phase 1 repeats.

Referring to FIGS. 11A–11G, an example of the power extracted from transducer 12 in circuit 310 is graphically represented where the open circuit amplitude of the voltage across transducer 12 would have been 10 volts. The same transducer and disturbance described above with reference to FIGS. 3 are used in this example. A 168H inductor is used in this example such that the time constant of the inductor and transducer corresponds to 100 Hz.

Figure 11A:
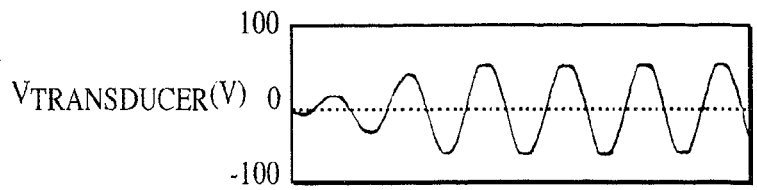
FIGS. 11A–11G are various voltage, current, power, and energy waveform diagrams of the circuit of FIG. 10B.
Figure 11B:
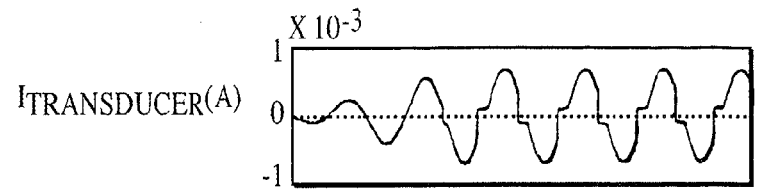

FIG. 11B shows the voltage across transducer 12 of FIG. 10 as a function of time. The peak amplitude of the voltage grows as a result of resonance until it is greater than the voltage on storage elements 318, 320. This voltage is greater than twice any peak voltage of the open circuit voltage of transducer 12 due to disturbance 14 alone (see FIG. 4A). Here, the peak amplitude of the voltage is about 60 volts. (The circuit can act in pure transient scenarios although transient to steady state is shown.)

Figure 11C:
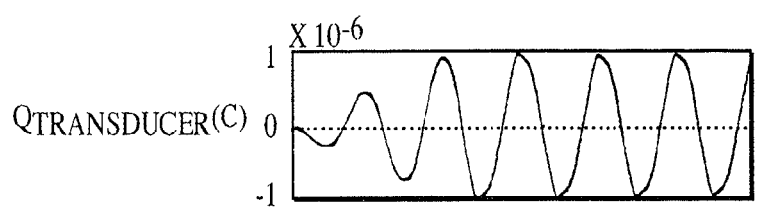

FIG. 11B shows the current waveform on transducer 12 and FIG. 11C the charge waveform on transducer 12. Due to the resonance of the circuit, the peak of the integral of the current onto and off transducer 12 is greater than two times higher than any peak of an integral of a current of a short circuit transducer due to the disturbance alone (see FIGS. 4B and 4C).

Figure 11D:
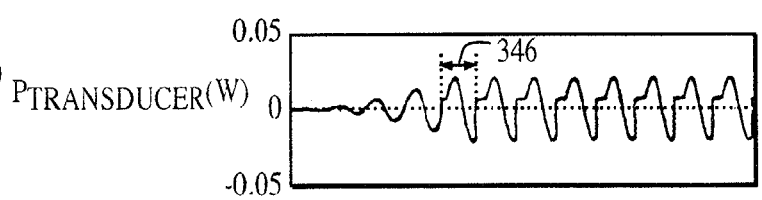
Figure 11E:
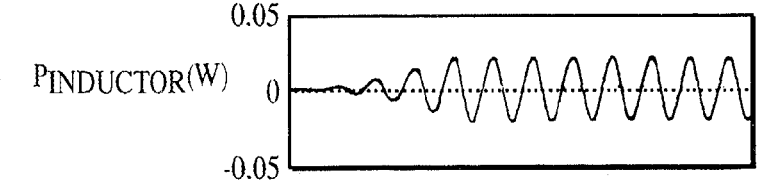

Due to the phasing of the voltage and current waveforms, the power flow to and from transducer 12, FIG. 11D, alternates between peaks of about 0.02 and −0.02 Watts. Thus, power flows to transducer 12 from resonator circuit 312 and from transducer 12 to resonator circuit 312 during the course of disturbance 14 on transducer 12, for example, during a single sinusoidal cycle 346, with the net power flowing from transducer 12 to storage element 318, 320. The cycle need not be sinusoidal, for example, where the disturbance has multiple frequency harmonics or broad frequency content such as in a square wave, a triangular wave, a saw tooth wave, and broadband noise.

The power into inductor 312 is shown in FIG. 11 E. Where the waveform is positive, power is being stored in inductor 312, and where the waveform is negative, power is being discharged from inductor 312.

Figure 11F:
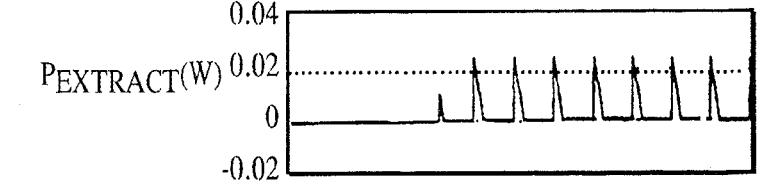
Figure 11G:
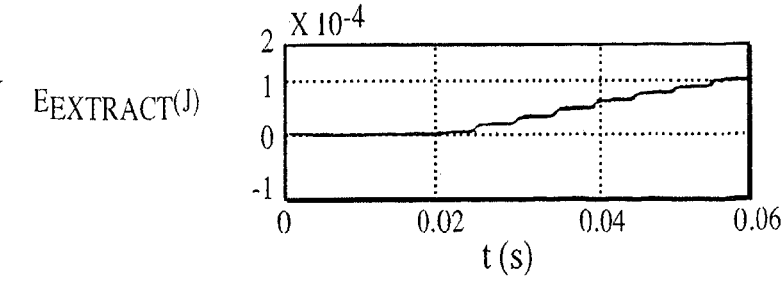

The extracted power and energy are shown in FIGS. 11F and 11G. Over a period of 0.06 seconds, approximately $1.0 \times 10^4$ Joules of energy are extracted.

The voltage across storage elements 318, 320 is tuned to optimize the efficiency of the power extraction. For example, voltage across storage elements 318, 320 is optimally about half the peak steady state voltage across the transducer if no rectifier were coupled to the transducer and the transducer and inductor connected in parallel were resonating under the same disturbance. An adaptive system uses a sensor to adapt to changing system frequencies, damping, or behavior to adapt the resonator or adapt the storage element voltage level.

Figure 12:
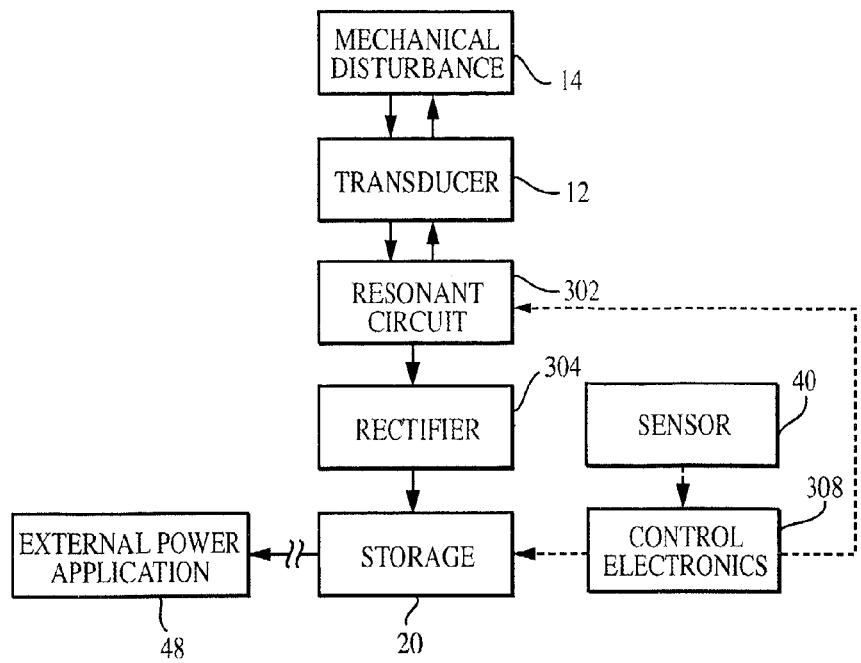
FIG. 12 is a block diagram of the power extraction system of FIG. 10B.

FIG. 12 shows the flow of power between disturbance 14 and storage element 20, and the flow of information (dashed lines). The power from mechanical disturbance 14 is transferred to transducer 12 which converts the mechanical power to electrical power. The power from transducer 12 is transferred to storage element 20 through resonant circuit 302 and rectifier 304. Power can also flow from resonant circuit 302 to transducer 12. Transducer 12 can then convert any received electrical power to mechanical power which in turn acts upon mechanical disturbance 14.

The power for sensor 40 and control electronics 308 is supplied by the energy accumulated in storage element 20, which has been extracted from disturbance 14. The cyclic peak power needed by transducer 12 is supplied by resonant circuit 302. Energy accumulated in storage element 20 can also or alternatively be used to power an external application 48 or the power extraction circuitry itself for vibration suppression.

Rather than employ a storage element, extracted power can be used directly to power external application 48.

Figure 13:
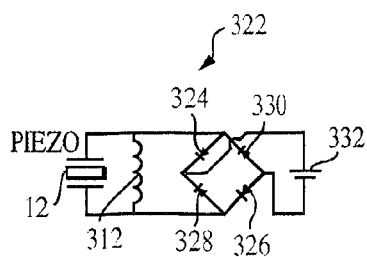
FIG. 13 is a circuit diagram of an alternative embodiment of a resonant rectifier power extraction system.

An alternative resonant circuit 322 is shown in FIG. 13. Circuit 322 includes an inductor 312 and four diodes 324, 326, 328 and 330 connected as a full wave bridge. Power extracted from transducer 12 is stored in storage element 332.

The current flow through circuit 322 can be described in four phases:

Phase I: As the transducer voltage increases from zero, no current flows through diodes 324, 326, 328 and 330 while the transducer voltage is less than the voltage on storage element 332.

Phase II: When the transducer voltage grows larger than the voltage on storage element 332, diodes 324, 326 become forward biased, and current flows through diodes 324, 326 and into storage element 332.

Phase III: As the transducer voltage drops, all diodes are reverse-biased and the system operates as an open circuit.

Phase IV: When the transducer voltage goes negative and has a magnitude greater than the voltage on storage element 332, diodes 328 and 330 become forward biased, and current flows through diodes 328 and 330 into storage element 332. As the transducer voltage begins to increase, all diodes again become reverse biased and phase 1 repeats.

Figure 14:
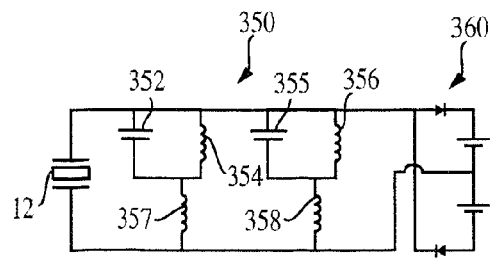
FIG. 14 is a circuit diagram of an additional alternative embodiment of a resonant rectifier power extraction system.

Referring to FIG. 14, a more sophisticated resonant circuit 350 includes two capacitor and inductor pairs 352, 354 and 355, 356, respectively, and two resonance inductors 357, 358. Each capacitor, inductor pair is tuned to a different frequency of interest. Thus, circuit 350 has multiple resonances which can be tuned to or near multiple disturbance frequencies or multiple resonances of the mechanical system. Additional capacitors and inductors may be incorporated to increase the number of resonances in circuit 350. Broadband behavior can be attained by placing a resistance in series or parallel with the inductors. FIG. 14 shows resonant circuit 350 connected to a voltage doubling rectifier 360, which operates as in FIG. 10B.

The different resonant circuits of FIGS. 10B and 14 can be attached to different rectifier circuits, such as a full bridge rectifier or an N-stage parallel-fed rectifier.

A passive voltage doubling rectifier circuit 410 for extracting energy from transducer 12 is shown in FIG. 15. Circuit 410 includes diodes 414, 416. Power extracted from transducer 12 is stored in storage elements 418, 420.

The current flow through circuit 410 can be described in four phases:

Phase I: As the transducer voltage increases from zero, no current flows through diodes 414, 416 while the transducer voltage is less than the voltage on storage element 418.

Phase II: When the transducer voltage grows larger than the voltage on storage element 418, diode 414 becomes forward biased, and current flows through diode 414 into storage element 418.

Phase III: As the transducer voltage drops, diodes 414, 416 are reverse-biased and the circuit operates as an open circuit.

Phase IV: When the transducer voltage 4 goes negative and has a magnitude greater than the voltage on storage element 420, diode 416 becomes forward biased, and current flows through diode 416 into storage element 420. As the transducer voltage begins to increase, diodes 414, 416 are reverse-biased and phase 1 repeats.

Referring to FIGS. 16A–16F, an example of the power extracted from transducer 12 in circuit 410 is graphically represented where the open circuit amplitude of the voltage across transducer 12 would have been 10 volts. FIG. 16A shows the voltage across transducer 12 as a function of time. The peak amplitude of the voltage is about 5 volts. FIG. 16B shows the current waveform on transducer 12, and FIG. 16C the charge waveform.

The power to and from transducer 12, FIG. 16D, has a peak value of about $5 \times 10^{-4}$ Watts. The extracted power and energy are shown in FIGS. 16E and 16F. Over a period of 0.06 seconds, approximately $0.75 \times 10^{-5}$ Joules of energy are extracted.

The voltage across storage elements 418, 420 is tuned to optimize power extraction. The voltage across storage elements 418, 420 is optimally about half the voltage which would appear across an open circuit transducer undergoing the same mechanical disturbance.

Figure 17:
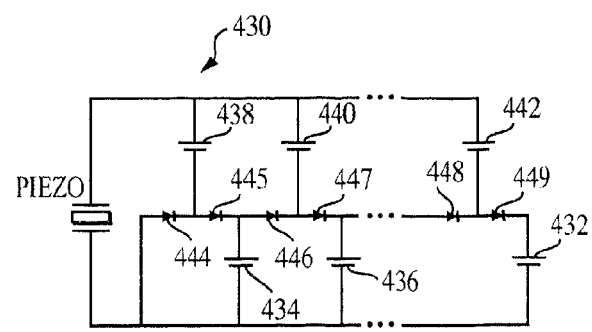
FIG. 17 is a circuit diagram of an alternative embodiment of a passive rectifier power extraction system.

Referring to FIG. 17, in a passive, N-stage parallel fed voltage rectifier 430 the voltage of storage element 432 is N times the amplitude of the voltage of disturbance 14. Capacitors 434, 436 act as energy storage elements with the voltage in each stage being higher than the voltage in the previous stage. Capacitors 438, 440 and 442 act as pumps transferring charge from each stage to the next, through diodes 444–449. A resonant circuit as described above can be incorporated into rectifier 430.

Figure 18A:
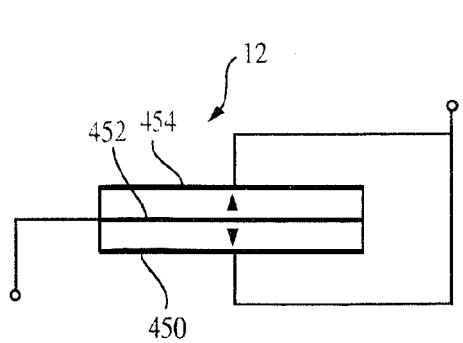
FIGS. 18A–18B illustrate partitioning of a transducer.
Figure 18B:
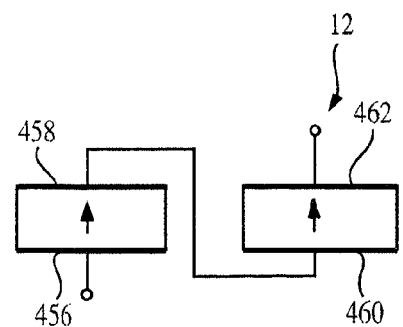

A transducer may be partitioned, and different electrode or coil configurations, that is, the electrical connections to transducer 12, may be used to optimize electric characteristics. Such configurations are shown for piezoelectric transducers in FIGS. 18A and 18B where for the same volume of material and the same external disturbance, different electrode configurations provide tradeoffs between the voltage and current output of transducer 12. For example, in FIG. 18A transducer 12 is segmented longitudinally and connected electrically in parallel with electrodes 450, 452, and 454, providing for higher current and lower voltage. In FIG. 18B, the transducer area is segmented and connected electrically in series with electrodes 456, 458, 460, and 462, providing for higher voltage and lower current.

Referring to FIG. 19, a circuit 500 for extracting electrical power from a transducer 501 includes an inductor 502, and two symmetric sub-circuits 504a, 504b. Each sub-circuit 504a, 504b has a diode 505a, 505b, a switching element 506a, 506b, a storage element 507a, 507b, and control circuitry 508a, 508b, respectively. The switching element 506a, 506b, is, for example, a MOSFET, bipolar transistor, IGBT, or SCR. The storage element 507a, 507b is, for example, a capacitor, a rechargeable battery or combination thereof.

Circuit 500 can also be used to dampen vibration of a structure, for example, vibrating machinery or sporting good, to which transducer 501 is coupled.

The operation of circuit 500 is described with reference to FIGS. 20A–20C. For reference, FIG. 20A shows the voltage on transducer 501 as a result of an oscillating external disturbance, in the absence of circuit 500. The operation of circuit 500 can be divided into four phases. FIGS. 20B and 20C are graphical representations of the four phases, FIG. 20B showing the voltage across transducer 501 as a function of time, and FIG. 20C showing the current through transducer 501 as a function of time.

Phase I: As the voltage on transducer 501 increases in response to the oscillatory disturbance, switches 506a and 506b are both in the off position, and no current flows through the switches.

Phase II: After the voltage on transducer 501 peaks, control circuit 508a turns on switch 506a. Current from transducer 501 flows via the inductor 502, the diode 505a, and the switch 506a to the energy storage element 507a.

Phase IIa: While switch 506a is on, the amplitude of the current from transducer 501 increases, storing energy in inductor 502 and storage element 507a. In the process, the voltage across transducer 501 decreases and the voltage across storage element 507a increases. Current continues to increase from transducer 501 until the voltage across inductor 502 reaches zero.

Phase IIb: As the current from transducer 501 begins to decrease, the energy stored in inductor 502 is released, forcing the voltage across transducer 501 to drop below zero. This continues until the energy in inductor 502 is depleted, at which point the voltage across transducer 501 approaches the negative of the value it had prior to the beginning of phase II.

Phase III: With both switches 506a, 506b off for the next half cycle, the voltage on transducer 501 continues to decrease in response to the oscillatory disturbance.

Phase IV: After the voltage on transducer 501 reaches a minimum, the symmetric portion 504b of the circuit is activated. The control circuit 508b turns on switch 506b. Current from transducer 501 flows via the inductor 502, the diode 505b, and the switch 506b to the energy storage element 507b.

Phase IVa: While the switch is on, the amplitude of the current from transducer 501 increases, storing energy in inductor 502 and storage element 507b. In the process, the voltage across transducer 501 decreases and the voltage across storage element 507b increases. Current from transducer 501 continues to increase until the voltage across inductor 502 reaches zero.

Phase IVb: As the current from transducer 501 begins to decrease, the energy stored in inductor 502 is released, forcing the voltage across transducer 501 to drop below zero. This continues until the energy in inductor 502 is depleted, at which point the voltage across transducer 501 approaches the negative of the value it had prior to the beginning of phase IV.

As the four phases repeat, the magnitude of the voltage across transducer 501 increases. The voltage can be many times higher than the voltage which would have been measured across transducer 501 in the absence of circuit 500. As a result, more energy is extracted from transducer 501 during phases II and IV.

Figure 21:
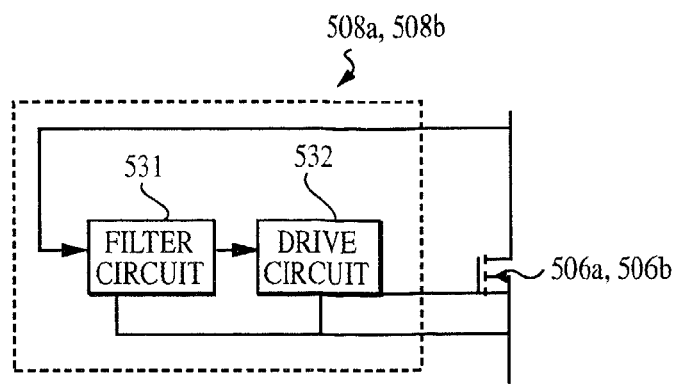
FIG. 21 is a block diagram of a control circuit of the power extraction system of FIG. 19.

Referring to FIG. 21, the control circuitry 508a, 508b includes a filter circuit 531 for processing the voltage across switch 506a, 506b, respectively, and a switch drive circuit 532. In this embodiment, the control circuit is powered from an external voltage source, not shown, such as a battery or power supply. The filter circuit 531 differentiates the signal and turns the switch on when the voltage across the switch begins to decrease. In addition, filter circuit 531 can include components for noise rejection and for turning the switch on if the voltage across the switch becomes greater than a pre-specified threshold. Filter circuit 531 can also include resonant elements for responding to specific modes of the disturbance.

Figure 22:
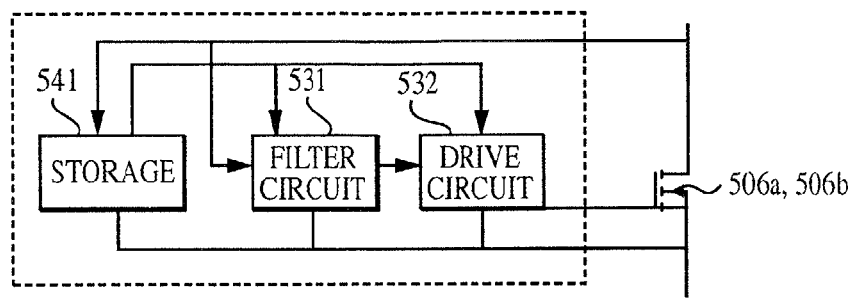
FIG. 22 is a block diagram of a self-powered control circuit.

Referring to FIG. 22, in an alternative embodiment, the control circuit includes a storage element 541 which is charged by current from transducer 501. Storage element 541 is then used to power filter circuit 531 and switch drive circuit 532. This embodiment is self-powered in the sense that there is no need for an external power supply.

Figure 23:
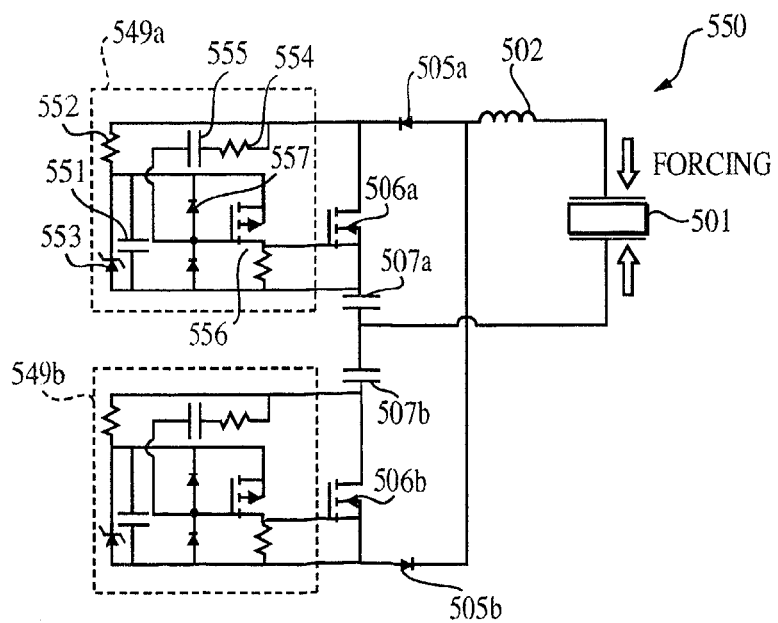
FIG. 23 is a circuit diagram of a power extraction system employing a self-powered control circuit.

Referring to FIG. 23, a self-powered circuit 550 for extracting electrical power from transducer 501 requires no external power for operating control circuits 549a, 549b and transducer 501. A capacitor 551, which is charged up through a resistor 552 and/or through resistor 554, capacitor 555 and diode 557 during phase I of the circuits operation (i.e. while the voltage across the transducer is increasing), acts as the storage element 541. A zener diode 553 prevents the voltage of capacitor 551 from exceeding desired limits. When the voltage across transducer 501 begins to decrease, a filter (resistor 554 and capacitor 555) turns on a p-channel MOSFET 556. MOSFET 556 then turns on switch 506a, using the energy stored in capacitor 551 to power the gate of MOSFET 556. In the process, capacitor 551 is discharged, causing switch 506a to turn off after a desired interval. The same process is then repeated in the second half of the circuit.

Figure 24:
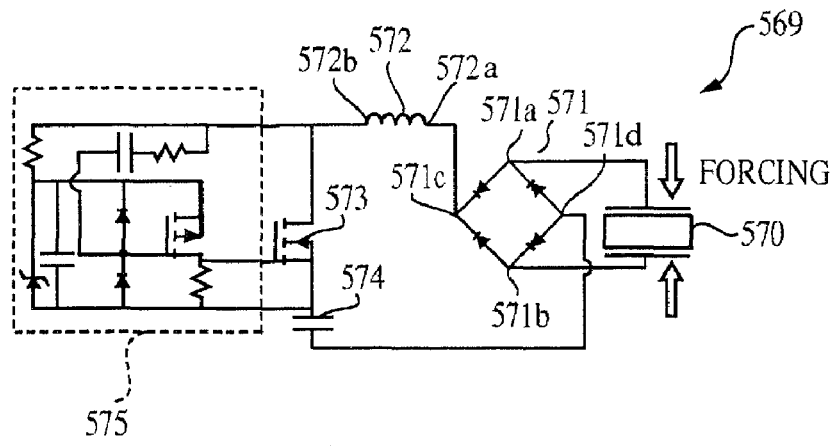
FIG. 24 is a circuit diagram of an alternative embodiment of a power extraction system.

Referring to FIG. 24, a circuit 569 for extracting electrical power from a transducer 570 includes a rectifier 571, an inductor 572, a switching element 573, a storage element 574, and control circuitry 575. The switching element 573 is, for example, a MOSFET, bipolar transistor, IGBT, or SCR. The storage element 574 is, for example, a capacitor, a rechargeable battery or combination thereof. The control circuit 575 corresponds to self-powered control circuitry 549a described above with reference to FIG. 23. Rectifier 571 has first and second input terminals 571a, 571b, and first and second output terminals 571c, 571d. First and second input terminals 571a, 571b are connected across first and second terminals 570a, 570b of transducer 570. Inductor 572 includes first and second terminals 572a, 572b. First terminal 572a of inductor 572 is connected to first output terminal 571c of rectifier 571. Switching element 573 is connected to second terminal 572b of inductor 572 and second output terminal 571d of rectifier 571.

Circuit 569 can also be used to dampen vibration of a structure, for example, vibrating machinery or sporting good.

Figure 25:
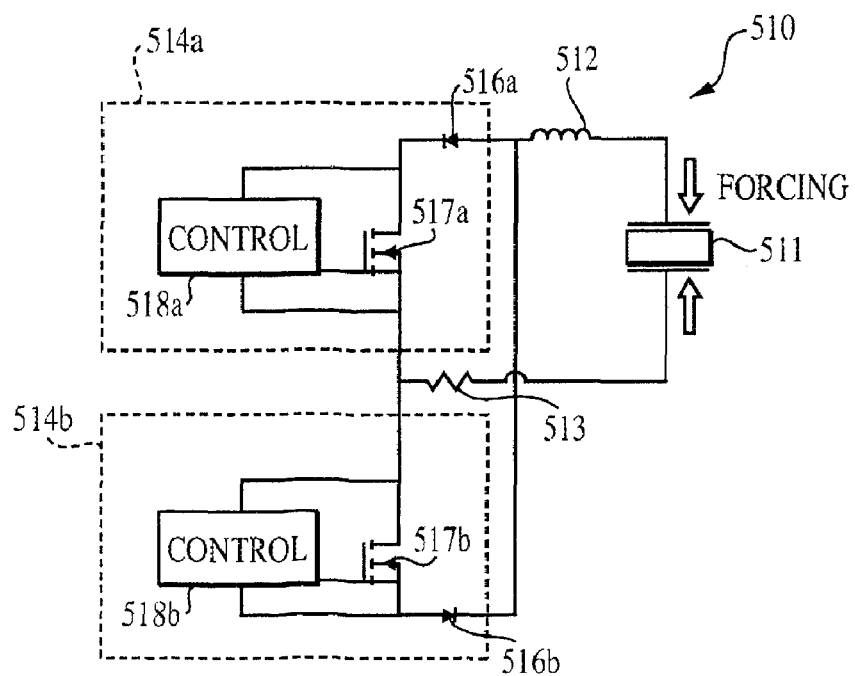
FIG. 25 is a circuit diagram of a power damping system.

Referring to FIG. 25, a circuit 510 for dampening vibration of a structure to which a transducer 511 is attached includes an energy dissipation component 513, such as a resistor, in the circuit. Circuit 10 also includes an inductor 512 and two symmetric sub-circuits 514a, 514b. Each sub-circuit 514a, 514b includes a diode 516a, 516b, a switching element 517a, 517b, and control circuitry 518a, 518b, respectively. The switching element 517a, 517b is, for example, a MOSFET, bipolar transistor, IGBT, or SCR. The dissipation element 513 can be eliminated if the inherent energy loss in the remaining circuit components provide sufficient energy dissipation.

Figure 26:
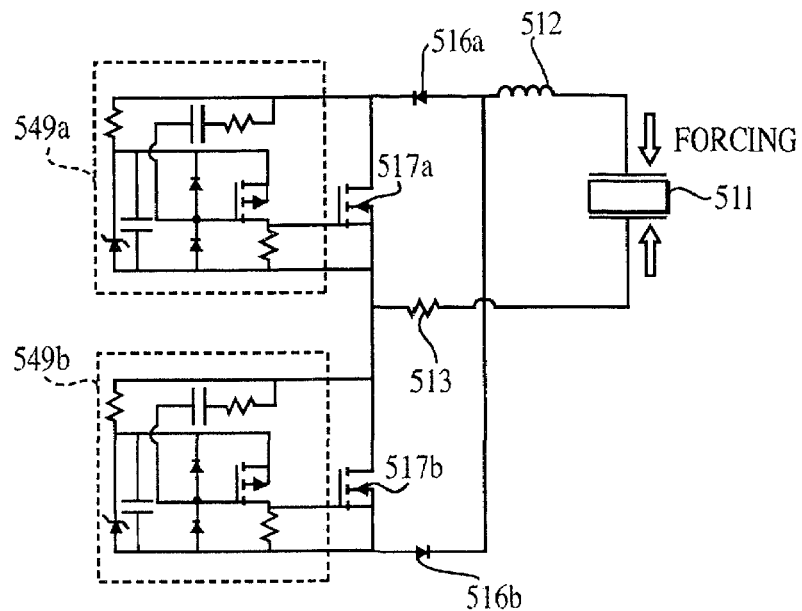
FIG. 26 is a circuit diagram of a self-powered power damping system.

FIG. 26 shows an implementation of the circuit of FIG. 25 incorporating the self-powered control circuitry 549a, 549b described above with reference to FIG. 23.

Figure 27:
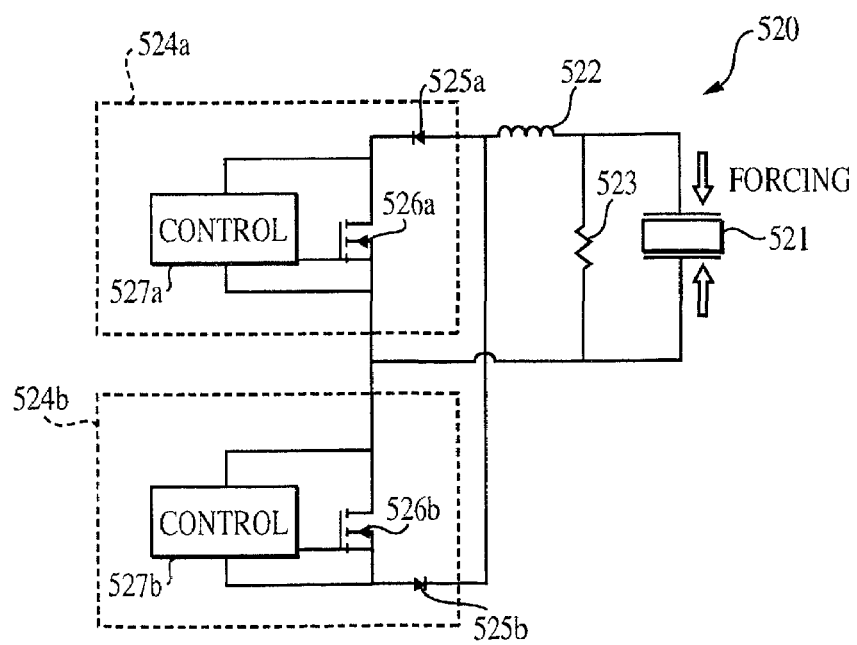
FIG. 27 is a circuit diagram of an alternative embodiment of a power damping system.

Referring to FIG. 27, a circuit 520 for dampening vibration of a structure to which a transducer 521 is attached includes an inductor 522, an energy dissipation component 523, such as a resistor, and two symmetric sub-circuits 524a, 524b. Each sub-circuit 524a, 524b includes a diode 525a, 525b, a switching element 526a, 526b, and control circuitry 527a, 527b, respectively. The switching element 516a, 526b is, for example, a MOSFET, bipolar transistor, IGBT, or SCR. The dissipation component 523 can be eliminated if the inherent energy loss in the remaining circuit components provide sufficient energy dissipation. Control circuitry 527a, 527b can be as described above with reference to FIG. 26.

The placement of the dissipation component in FIGS. 25 and 27 effects the size of the circuit components selected to provide the desired dissipation. The particular placement depends upon the amplitude and frequency of the vibrations of the mechanical disturbance and the capacitance of the transducer.

Figure 28:
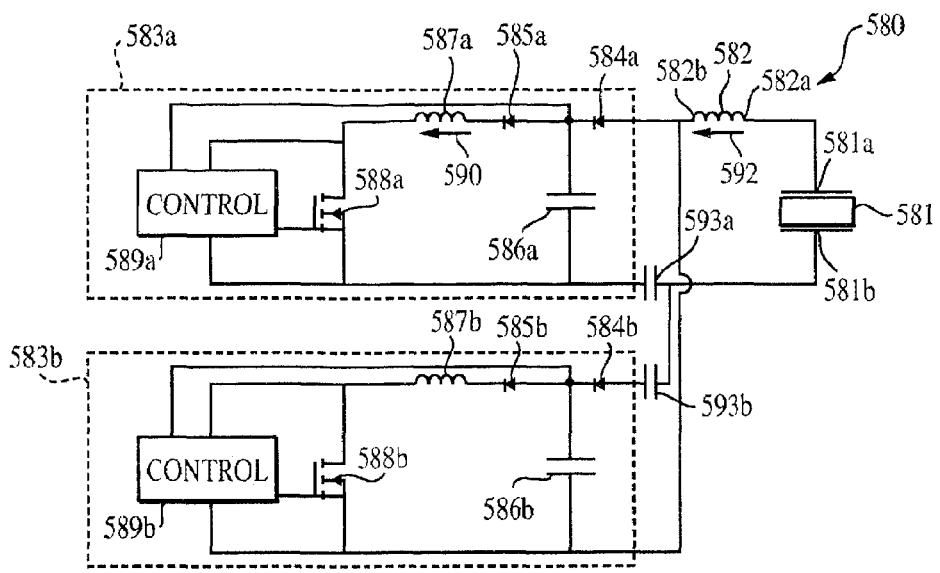
FIG. 28 is a circuit diagram of an additional alternative embodiment of a power extraction system.

Referring to FIG. 28, a circuit 580 for extracting electrical power from a transducer 581 includes an inductor 582 and two symmetric subcircuits 583a, 583b. Each subcircuit 583a, 583b includes a pair of diodes 584a and 585a, 584b and 585b, a capacitor 586a, 586b, an inductor 587a, 587b, a switching element 588a, 588b, control circuitry 589a, 589b, and storage element 593a, 593b, respectively. The switching element 588a, 588b is, for example, a MOSFET, bipolar transistor, IGBT, or SCR. Inductor 582 has a first terminal 582a connected to a first terminal 581a of transducer 581, and a second terminal 582b connected to subcircuit 583a. Subcircuit 583a is also connected to a second terminal 581b of transducer 581. Subcircuit 583b is also connected to second terminal 582b of inductor 582 and second terminal 581b of transducer 581. The storage elements 593a, 593b have relatively large capacitance values and therefore their voltage is small relative to the transducer voltage or the voltage across capacitors 586a, 586b. Diodes 584a, 584b, 585a, 585b ensure that power flows into storage elements 593a, 593b.

Circuit 580 can also be used to dampen vibration of a structure, for example, vibrating machinery or sporting good, to which transducer 531 is coupled. For this purpose, the storage elements 593a, 593b can be replaced by dissipation components, for example, resistors, as in FIG. 25. Alternatively, a dissipation component can be connected in parallel with transducer 581, as in FIG. 27. The dissipation component can be eliminated if the inherent energy loss in the remaining circuit components provide sufficient energy dissipation.

Figure 29A:
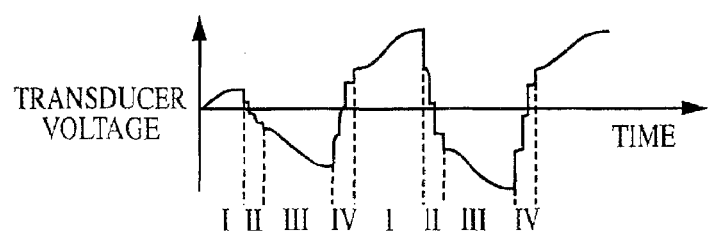
FIGS. 29A–29C are voltage verses time graphs.
Figure 29B:
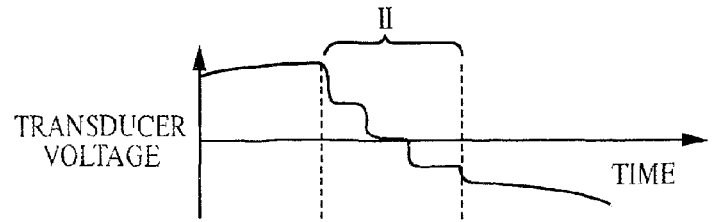
Figure 29C:
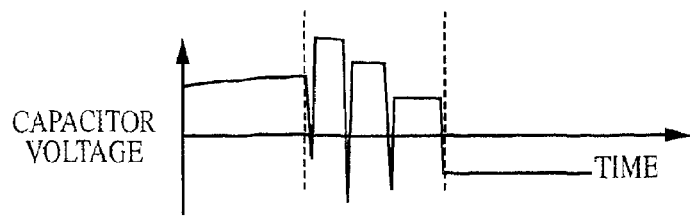

The operation of circuit 580 is described with reference to FIGS. 29A–29C. FIG. 29A shows the voltage across transducer 581 as a function of time and can be compared with the waveform of FIG. 20B. The additional inductors 587a, 587b and capacitors 586a, 586b in each subcircuit, in combination with control circuits 589a, 589b, described further below, cause multiple steps in the voltage during phase II and phase IV. FIGS. 29B and 29C show in more detail the voltage across transducer 581 and across capacitor 586a during phase II.

Phase I: As the voltage on transducer 581 increases in response to the oscillatory disturbance, switches 588a, 588b are both in the off position, and no current flows through the switches. The voltage across capacitor 586a is effectively equal to the voltage across transducer 581.

Phase II: After the voltage on transducer 586a peaks, control circuit 589a turns on switch 588a. Current 590 from capacitor 586a flows via diode 585a and inductor 587a through switch 588a. Thus the voltage across capacitor 586a drops rapidly. As the voltage across capacitor 586a drops below the voltage across transducer 581, current 592 begins to flow from transducer 581 through inductor 582 and diode 584a to capacitor 586a. As current 592 becomes larger than current 590, the voltage across capacitor 586a stops decreasing and begins to increase. Switch 588a is turned off as soon as the voltage across capacitor 586a begins to increase. The current from transducer 581 then causes the voltage across capacitor 586a to increase rapidly to a value possibly larger than its value prior to the beginning of phase II. During this process, the voltage across transducer 581 is reduced to a fraction of its value prior to phase II. After a short delay, the control circuit turns on switch 588a again, and the process is repeated several times during phase II. Thus the voltage across transducer 581 decreases in a number of steps.

Phase III: With both switches 588a, 588b off for the next half cycle, the voltage on transducer 581 continues to decrease in response to the oscillatory disturbance. The voltage across capacitor 586b is effectively equal to the voltage across transducer 581.

Phase IV: After the voltage on capacitor 586b reaches a peak, the process of phase II repeats for subcircuit 583b.

As the four phases repeat, the magnitude of the voltage across transducer 581 increases. The multiple switching events that occur during phases II and IV, in effect slow the transition in the transducer voltage that occurs during these phases. As a result, less high frequency noise is caused in the structure to which transducer 581 is coupled in the process of damping the low frequency vibration as compared to the circuit of FIG. 19.

Figure 30:
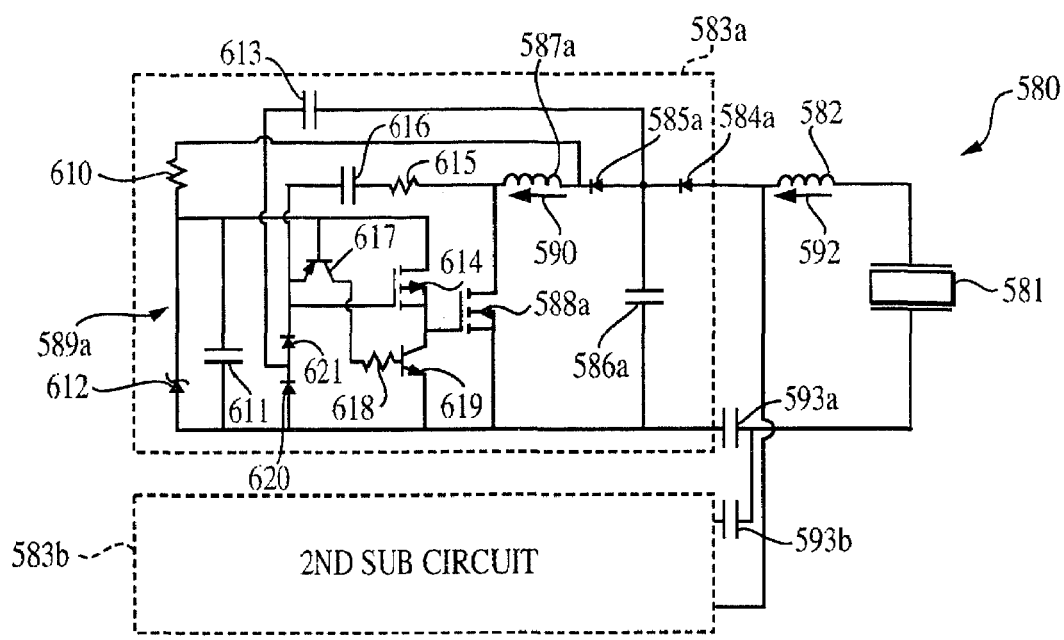
FIG. 30 is a circuit diagram of a control circuit of the circuit of FIG. 28.

Referring to FIG. 30, a preferred embodiment of the control circuit 589a is self-powered, requiring no external power. A capacitor 611 is charged through resistor 610 and/or through resistor 615, capacitor 616, diode 621, and transistor 617, during phase I of the circuit's operation (i.e., while the voltage across the transducer is increasing). A zener diode 612 prevents the voltage of capacitor 611 from exceeding desired limits. When the voltage across capacitor 586a begins to decrease, a high-pass filter (resistor 615 and capacitor 616) turns on a p-channel MOSFET 614. MOSFET 614 then turns on switch 588a, using the energy from capacitor 611 to power the gate of switch 588a. Current 590 flowing through inductor 587a and switch 588a causes the voltage across capacitor 586a to decrease rapidly. As the voltage across capacitor 586a decreases, current 592 begins to flow from transducer 581 through inductor 582 and diode 584a to capacitor 586a. As current 592 becomes larger than current 590, the voltage across capacitor 586a stops decreasing and begins to increase, at which point, a high-pass filter (capacitor 613) turns off MOSFET 614 through diode 621, and turns on transistor 617 which causes transistor 619 to turn on. As a result, switch 588a is turned off. The process is repeated several times, causing the voltage across transducer 581 to decrease in a number of steps, as shown in FIG. 29.

Other embodiments are within the scope of the following claims.

What is claimed is:

1. A method for at least partially suppressing a vibration of a mechanical disturbance, comprising:
   measuring a characteristic of the disturbance using a sensor; and
   based on the measured characteristic, actuating at least one active switch of an electrical circuit to cause an electromechanical transducer coupled to the disturbance by a mechanical amplifier to act on the disturbance to at least partially suppress the vibration.

2. The method of claim 1, wherein the transducer at least approximately matches a phase of the disturbance to at least partially suppress the vibration.

3. The method of claim 1, wherein the transducer at least approximately matches a motion of the disturbance to at least partially suppress the vibration.

4. The method of claim 1, wherein the measured characteristic is selected from the group consisting of: vibration amplitude, vibration frequency, vibration mode, physical strain, position, displacement, pressure, voltage, current, temperature, humidity, altitude, force, orientation, acceleration, motion, a physically measurable quantity corresponding to a mechanical or electrical property, a rate of change of a subset thereof, and a combination thereof.

5. The method of claim 1, wherein the sensor is selected from the group consisting of: strain gauge, pressure sensor, PVDF film, accelerometer, active fiber composite sensor, composite sensor, and a combination thereof.

6. The method of claim 1, including using the transducer to convert at least a portion of mechanical energy of the disturbance to electrical energy, and applying at least a portion of the electrical energy to the transducer.

7. The method of claim 1, including using the transducer to convert at least a portion of mechanical energy of the disturbance to electrical energy, and applying at least a portion of the electrical energy to the electrical circuit.

8. The method of claim 1, including using the transducer to convert at least a portion of mechanical energy of the disturbance to electrical energy, and applying at least a portion of the electrical energy to the sensor.

9. A system for at least partially suppressing a vibration of a mechanical disturbance, comprising:
- an electromechanical transducer coupled to the disturbance by a mechanical amplifier and configured for exchanging mechanical energy with the disturbance;
- a sensor for measuring a characteristic of the disturbance; and
- an electrical circuit in communication with the sensor and coupled to the transducer for causing the transducer to act on the disturbance to at least partially suppress the vibration, based on the measured characteristic, wherein the electrical circuit includes at least one active switch.

10. The system of claim 9, wherein the transducer at least approximately matches a phase of the disturbance to at least partially suppress the vibration.

11. The system of claim 9, wherein the transducer at least approximately matches a motion of the disturbance to at least partially suppress the vibration.

12. The system of claim 9, wherein the transducer is selected from the group consisting of: piezoelectric transducer, antiferroelectric transducer, electrorestrictive transducer, peizomagnetic transducer, magnetostrictive transducer, magnetic shape memory transducer, and a combination thereof.

13. The system of claim 9, wherein the sensor is selected from the group consisting of: strain gauge, pressure sensor, PVDF film, accelerometer, composite sensor, and a combination thereof.

14. The system of claim 9, wherein the transducer is coupled to the disturbance by a hydraulic amplifier.

15. The system of claim 9, wherein at least one of the at least one active switch is selected from the group consisting of: MOSFET, bipolar transistor, ZGBT, SCR, and a combination thereof.

16. The system of claim 9, wherein at least one of the at least one active switch includes a diode.

17. The system of claim 9, wherein the electrical circuit includes a resonant circuit to at least approximately match a characteristic of the vibration.

18. The system of claim 17, wherein the resonant circuit is coupled to the transducer to at least approximately match a behavior of the transducer.

19. The system of claim 17, wherein the resonant circuit includes at least one capacitor.

20. The system of claim 17, wherein the resonant circuit includes at least one inductor.

21. The system of claim 9, wherein the electrical circuit includes a control circuit for controlling at least one of the at least one active switch.

22. The system of claim 21, wherein the controlling employs a method selected from the group consisting of: rate feedback, positive position feedback, position-integral-derivative feedback (PID), linear quadratic Gaussian (LQG) control, model-based control, a dynamic compensator-based control, and a combination thereof.

23. The system of claim 21, wherein the controlling includes adjusting a duty cycle of the at least one of the at least one active switch, to configure the transducer for at least approximately matching a behavior of the disturbance.

24. The system of claim 23, wherein the behavior of the disturbance includes a frequency of the vibration.

25. The system of claim 23, wherein the behavior of the disturbance includes a phase of the vibration.

26. The system of claim 9, wherein electrical energy supplied to the transducer is derived at least in part from a subset of energy extracted from the mechanical disturbance.

27. The system of claim 9, wherein the electrical circuit includes an amplifier circuit coupled to the transducer for providing energy exchange between the electrical circuit and the transducer.

28. The system of claim 27, wherein the amplifier circuit is selected from the group consisting of: a switching amplifier, a switched capacitor amplifier, a capacitive charge pump, an H-bridge amplifier, a half-bridge amplifier, and a combination thereof.

29. The system of claim 27, wherein the electrical circuit includes a control circuit for controlling the amplifier circuit.

30. The system of claim 29, wherein the controlling employs a method selected from the group consisting of: rate feedback, positive position feedback, position-integral-derivative feedback (PID), linear quadratic Gaussian (LQG) control, model-based control, a dynamic compensator-based control, and a combination thereof.

31. The system of claim 29, wherein controlling the amplifier circuit includes adjusting a duty cycle of at least a portion of the amplifier circuit, to configure the amplifier circuit for at least approximately matching a behavior of the disturbance.

32. The system of claim 9, wherein the electrical circuit includes a rectifier circuit.

33. The system of claim 32, wherein the rectifier circuit is coupled to the transducer.

34. A system for at least partially suppressing a vibration of a mechanical disturbance, comprising:
- an electromechanical transducer coupled to the disturbance by a mechanical amplifier and configured for converting at least a portion of mechanical energy associated with the disturbance to electrical energy;
- an electrical circuit coupled to the transducer to process at least a portion of the electrical energy, wherein the electrical circuit includes at least one active switch; and
- dissipating at least a portion of the processed electrical energy, thereby at least partially suppressing a vibration of the disturbance by reducing the mechanical energy associated with the disturbance.

35. The method of claim 1, wherein all electrical energy supplied to at least one of the transducers, the electrical circuit, and the sensor is derived solely from a subset of energy extracted from the mechanical disturbance.

36. The system of claim 9, wherein all electrical energy supplied to at least one of the transducer, the electrical circuit, and the sensor is derived at least in part from a subset of energy extracted from the mechanical disturbance.

37. The system of claim 36, wherein all electrical energy supplied to at least one of the transducer, the electrical circuit, and the sensor is derived solely from a subset of energy extracted from the mechanical disturbance.

38. The system of claim 9, wherein the measured characteristic is selected from the group consisting of: vibration amplitude, vibration frequency, vibration mode, physical strain, position, displacement, pressure, voltage, current, temperature, humidity, altitude, force, orientation, acceleration, motion, a physically measurable quantity corresponding to a mechanical or electrical property, a combination thereof, and a rate of change of the combination thereof.

* * * * *